United States Patent
Hatanaka et al.

(10) Patent No.: US 8,120,489 B2
(45) Date of Patent: Feb. 21, 2012

(54) WORKFLOW IMPROVEMENTS

(75) Inventors: Iwao Hatanaka, Acton, MA (US); Marc H. Horowitz, Cambridge, MA (US); Rajesh Patel, Burlington, MA (US); Marina Yurievna Popova, Arlington, MA (US); Kenneth R. Traub, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 970 days.

(21) Appl. No.: 11/759,323

(22) Filed: Jun. 7, 2007

(65) Prior Publication Data

US 2007/0288520 A1 Dec. 13, 2007

Related U.S. Application Data

(60) Provisional application No. 60/829,259, filed on Oct. 12, 2006, provisional application No. 60/812,397, filed on Jun. 9, 2006, provisional application No. 60/812,460, filed on Jun. 9, 2006.

(51) Int. Cl.
*G08B 13/14* (2006.01)
(52) U.S. Cl. ........................ 340/572.4; 705/28; 707/802
(58) Field of Classification Search .................. 235/375, 235/385; 340/572.4; 705/28; 707/613, 802
See application file for complete search history.

(56) References Cited

U.S. PATENT DOCUMENTS

| | | |
|---|---|---|
| 5,892,441 A | 4/1999 | Woolley et al. |
| 2003/0005287 A1 | 1/2003 | Wray et al. |
| 2003/0158795 A1 | 8/2003 | Markham et al. |
| 2005/0092825 A1 | 5/2005 | Cox, Jr. et al. |
| 2005/0139665 A1 | 6/2005 | Sato |
| 2005/0193222 A1 | 9/2005 | Greene |
| 2005/0228947 A1 | 10/2005 | Morita et al. |
| 2005/0252971 A1 | 11/2005 | Howarth et al. |
| 2005/0258956 A1 | 11/2005 | Neuwirth |
| 2005/0267882 A1 | 12/2005 | Aupperlee et al. |
| 2006/0049250 A1 | 3/2006 | Sullivan |
| 2006/0124738 A1 | 6/2006 | Wang et al. |
| 2007/0027966 A1 | 2/2007 | Singhal et al. |
| 2007/0143162 A1 | 6/2007 | Keever et al. |
| 2007/0290803 A1 | 12/2007 | Ayyagari et al. |

OTHER PUBLICATIONS

Bodoff et al., The J2EE Tutorial, Mar. 25, 2002, pp. 209-244.
International Search Report for PCT/US07/70526, dated Sep. 9, 2008, 6 pages.
Thin Client, Wikipedia, http://en.wikipedia.org/wiki/Thin_client, accessed Nov. 4, 2011.

*Primary Examiner* — Mohammad Ali
*Assistant Examiner* — Huawen Peng
(74) *Attorney, Agent, or Firm* — Fliesler Meyer LLP

(57) ABSTRACT

An RFID workflow module can use metadata to indicate configurable elements. An administration console can use the metadata to produce a configuration page for the RFID workflow module. The configuration page can allow a user to configure the RFID workflow module.

9 Claims, 28 Drawing Sheets

| | |
|---|---|
| Module Name | Observe Portal |
| Module Type | ObservePortal |

Override Default

| | | |
|---|---|---|
| | Tag Addition ECReport Name*: | Tag addition report |
| EPCIS: | | |
| | EPCIS Object Event Action*: | OBSERVE |
| ☑ | EPCIS Business Step URI: | urn:epcglobal:epcis:bizstep:fmcg:shipped |
| ☑ | EPCIS Disposition URI: | urn:epcglobal:epcis:disp:fmcg:unknown |
| ☑ | EPCIS Read Point URI: | urn:epcglobal:fmcg:ssl:0037000.00729.210,414 |
| ☑ | EPCIS Business Location URI: | urn:epcglobal:fmcg:ssl:0037000.00729.210 |
| ☑ | Output Destinations: | console:EPCISObjectEvent |
| Numeric Display: | | |
| ☐ | Display Duration: | 0 |
| | Tag Deletion ECReport Name*: | Tag deletion report |
| ☑ | Output Destinations: | Numeric Display |
| Stack Light: | | |
| ☐ | Display Duration: | 0 |
| ☑ | Output Destinations: | Stack Light |

* Required     OK   Revert   Cancel

FIG. 3K

| Module Name | Directional Portal |
| --- | --- |
| Module Type | DirectionalPortal |

- [x] Object Event Output Destinations: console:EPCISObjectEvent
- [x] EPCIS Read Point URI: urn:epcglobal:fmcg:ssl:0037000.00729.210,414
- [ ] Stale Tag Timeout: 180000

Side A:
  Tag Addition ECReport Name*: Tag addition report side A
  Tag Deletion ECReport Name*: Tag deletion report side A

Side B
  Tag Addition ECReport Name*: Tag addition report side B
  Tag Deletion ECReport Name*: Tag deletion report side B

Side A To Side B:
  EPCIS:
    Object Event Action*: OBSERVE
    Aggregation Event Action*: OBSERVE
  - [x] Business Step URI: urn:epcglobal:epcis:bizstep:fmcg:sent
  - [x] Disposition URI: urn:epcglobal:epcis:disp:fmcg:unknownsideAtoB
  - [x] Business Location URI: urn:epcglobal:fmcg:ssl:0037000.00729.100
  Numeric Display:
  - [ ] Display Duration: 0
  - [ ] Reset Interval: 15000
  - [x] Output Destinations: Numeric Display at Side B
  Stack Light:
  - [ ] Display Duration: 0
  - [x] Output Destinations: Stack Light at Side B

Side B To Side A:
  EPCIS:
    Object Event Action*: OBSERVE
    Aggregation Event Action*: OBSERVE
  - [x] Business Step URI: urn:epcglobal:epcis:bizstep:fmcg:received
  - [x] Disposition URI: urn:epcglobal:epcis:disp:fmcg:unknownsideBtoA
  - [x] Business Location URI: urn:epcglobal:fmcg:ssl:0037000.00729.200
  Numeric Display:
  - [ ] Display Duration: 0
  - [ ] Reset Interval: 15000
  - [x] Output Destinations: Numeric Display at Side A
  Stack Light:
  - [ ] Display Duration: 0
  - [x] Output Destinations: Stack Light at Side A

Aggregation Data:

* Required      [ OK ]  [ Revert ]  [ Cancel ]

FIG. 3L

State machine

| | |
|---|---|
| Modu... | Pallet Portal |
| Modu... | Pallet Portal module that determines pallet contents and generates EPCIS aggregation event |

Override
Default

| | |
|---|---|
| ECReport Name*: | Current tag report |
| Control Tag Patterns*: | urn:epc:pat:gid-64-i:10.[0-10].* |
| Pallet Tag Patterns*: | urn:epc:pat:sscc-64:*.*.* urn:epc:pat:sscc-96:*.*.* |

Transitions:

| | | |
|---|---|---|
| ☐ | Start Pallet Timeout: | 30000 |
| ☐ | End Pallet Timeout: | 5000 |
| | Start Case Timeout*: | 5000 |
| | End Case Timeout*: | 60000 |
| | Empty Report Count*: | 5 |

EPCIS:

| | | |
|---|---|---|
| | Aggregation Event Action*: | OBSERVE |
| ☑ | Business Step URI: | urn:epcglobal:epcis:bizstep:fmcg:shipped |
| ☑ | Disposition URI: | urn:epcglobal:epcis:disp:fmcg:unknown |
| ☑ | Read Point URI: | urn:epcglobal:fmcg:ssl:0037000.00729.210,414 |
| ☑ | Business Location URI: | urn:epcglobal:fmcg:ssl:0037000.00729.300 |
| ☑ | Output Destinations: | console:EPCISPalletPortalAggregationEvent |

Numeric Display:

| | | |
|---|---|---|
| ☐ | Display Duration: | 0 |
| ☑ | Output Destinations: | Numeric Display |

Stack Light:

| | | |
|---|---|---|
| ☐ | Display Duration: | 0 |
| ☑ | Output Destinations: | Stack Light |

Require:  [ OK ]  [ Revert ]  [ Cancel ]

FIG. 3N

```
                                                              HttpServlet
         com.connecterra.servlet.WorkflowEdgeServlet +WorkflowEdgeServlet()
+init(config:ServletConfig):void
+destroy():void
+doPost(request:HttpServletRequest,response:HttpServletResponse):void
#dispatch(reports:ECReports):void
-toXML(reports:ECReports):String
-loadProperties(context:ServletContext):void
```

FIG. 4D

```
                                                              HttpServlet
        com.connecterra.servlet.TelemetrySubscriberServlet +TelemetrySubscriberServlet()
+init(config:ServletConfig):void
+destroy():void
+doPost(request:HttpServletRequest,response:HttpServletResponse):void
#dispatch(reports:TelemetryReports):void
-toXML(reports:TelemetryReports):String
-loadProperties(context:ServletContext):void
-initWorkflowConfig():void
```

WORKFLOW IMPROVEMENTS

CLAIM OF PRIORITY

This application claims priority to U.S. Provisional Application No. 60/829,259 entitled "Workflow Improvements" by Hatanaka, et al., filed Oct. 12, 2006; U.S. Provisional Application No. 60/812,397 entitled "Edge Server" by Traub, et al., filed Jun. 9, 2006; U.S. Provisional Application No. 60/812,460 entitled "Enterprise Server" by Traub, et al., filed Jun. 9, 2006;

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

The present invention relates to systems that use workflow logic at a Radio Frequency Identification (RFID) edge server. The workflows can be used to obtain RFID data and do operations at a site. Fore example, the workflows can control the operation of stack lights, conveyers, and other elements at a warehouse.

BRIEF SUMMARY OF THE INVENTION

An RFID workflow module can use metadata to indicate configurable elements. An administration console can use the metadata to produce a configuration page for the RFID workflow module. The configuration page can allow a user to configure the RFID workflow module.

BRIEF DESCRIPTION OF THE DRAWINGS

FIGS. 4A-4F illustrates details of an RFID workflow.

FIGS. 7A-7D illustrates user interfaces for an RFID user interface.

DETAILED DESCRIPTION

Figure 1:
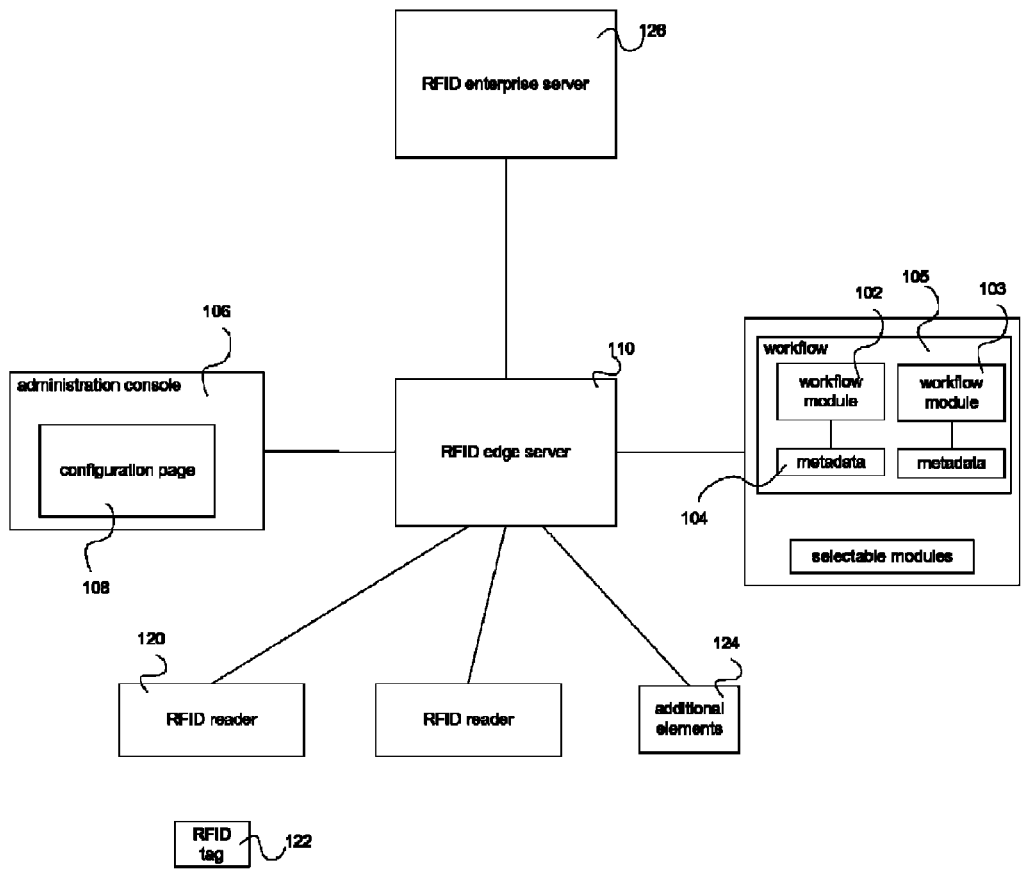
FIG. 1 is a diagram of an RFID system using workflow modules of one embodiment.
Figure 2:
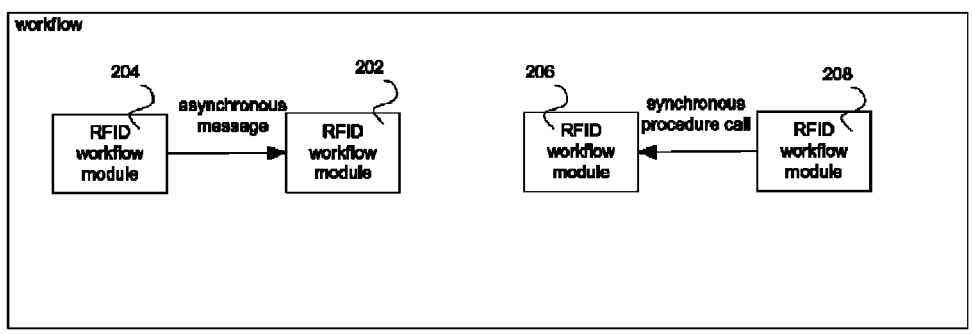
FIG. 2 is a diagram of an RFID system using workflow modules of an additional embodiment.

One embodiment of the present invention is a system comprising an RFID workflow module 102 and metadata 104 associated with the RFID workflow module 102. The metadata 104 can indicate configurable elements. An administration console 106 can use the metadata to produce a configuration page 108 for the RFID workflow module. The configuration page 108 can allow a user to configure the RFID workflow module.

Different types of workflow modules can use different metadata that can indicate the different configurable elements of the workflow modules. With this type of system, the configuration of the workflow modules can be done without requiring the configuration pages for an administration console to be designed specifically for a workflow module. The administration console can use the metadata to produce an appropriate configuration page.

The metadata can include indications of attributes and possible values, or ranges. The attributes can be used to indicate values on configuration pages. User input values can be constructed from the ranges or lists of possible values.

The metadata can be used to configure an instance of a workflow module with data input by a user through the configuration for the workflow.

The workflow can be used to interact with additional elements 124, such as stack lights, other sensors, conveyers, or the like.

The administration console 106 can be associated with an RFID edge server 110. The workflow module 102 can be combined with other workflow modules 103 to create a workflow 105. The workflow module 102 can use data from an RFID reader 120. The RFID reader 102 can obtain RFID data from an RFID tag 122. In one embodiment, some modules can communicate synchronously and some communicate asynchronous.

Data from the RFID edge server 110 can be sent to an RFID enterprise server 126. The RFID enterprise server can consolidate RFID data for an entire enterprise.

One embodiment of the present invention is a system comprising an RFID workflow module 202 receiving asynchronous messages from another RFID workflow module 204 and an additional workflow module 206 receiving synchronous procedure calls from a further RFID workflow module 208.

In this way, the workflow modules 202, 204, 206 and 208 can support both synchronous and asynchronous communication. The workflow modules do not need to force an operation into a inappropriate communication model since both types of communications are available.

The workflow modules 202, 204, 206 and 208 can be modules associated with metadata. The metadata can be used to produce a configuration page of an admin console. Workflow modules 202, 204, 206 and 208 can be combined to form a workflow.

In one embodiment:

A given local workflow instance can be realized as instances of one or more "Workflow Modules" (WMs), which may make use of "Workflow Libraries" (WLs).

A WM can be a JAVA class that is instantiated by the Edge Server. The Edge Server can control the lifecycle of the WM.

A WM can be a "Plug-in" in the configuration framework. A WM class can have an associated descriptor ("Plug-in Meta") that defines the names and types of its configuration parameters, and that WM instances can be created, redefined, and destroyed through a config API.

The Administration Console can be extended to provide a interface similar to the "RFID Devices" screen to create and configure WM instances.

A WL can be a class library that WMs may use. The edge server need not provide any configuration or lifecycle support to WLs.

One WM instance can interact with another by (a) obtaining a reference to the other WM instance via the Workflow Framework, then (b) calling a method. Depending on the WMs involved, this may be a simple method call (same thread), or a message pass (enqueued for execution on a different thread).

When one WM instance interacts with another, the WM can expose a configuration parameter that the user sets to the name of the other WM instance. This can allow customers to assemble several WM instances into a larger workflow, and thereby also gives a degree of workflow customization beyond merely changing configuration parameters.

The container for WMs can be an RFID edge server. This means that WMs can be deployed in the same JVM as the Edge Server. If two separate processes are desired, however, a customer can deploy two Edge Servers: one configured only with RFID Devices and whose ALE API is used, and the other configured only with WMs which receives ALE notifications from the first.

Figure 3A:
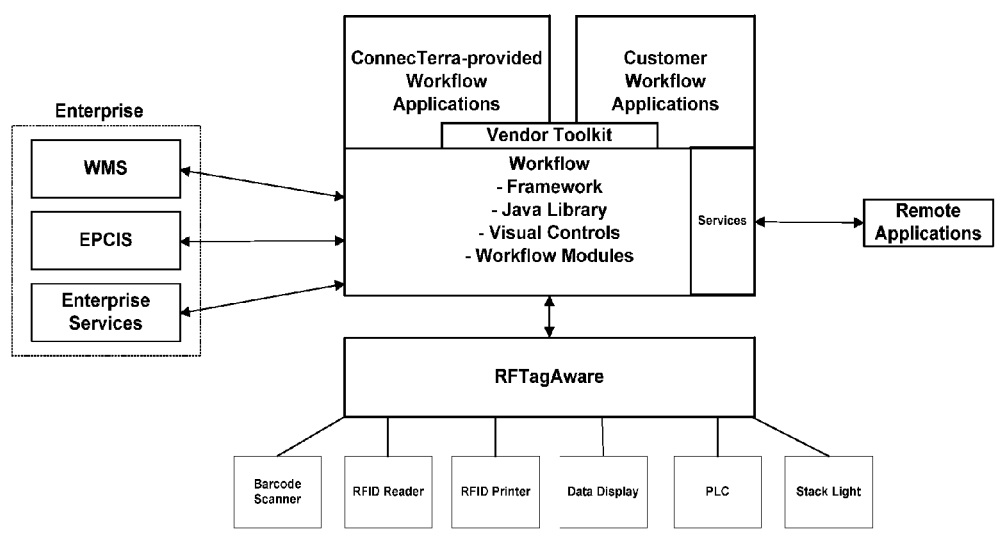
FIGS. 3A-3N illustrates details of a workflow system of one embodiment.

As shown in FIG. 3A, a Workflow system can provide the building blocks for rapid creation and deployment of workflow applications which access RFID devices through RFTagAware and communicate with enterprise systems:

In an exemplary embodiment, the following key components can comprise the Workflow:

RFTagAware
  The base infrastructure software for tag reading and writing
Workflow Framework
  The set of libraries, deployment modules, and services for workflows
Vendor Toolkit
  Toolkit in which SDK components can be leveraged to construct workflows (e.g., page flows)
Workflow Applications
  Deployable applications built upon the SDK provided by ConnecTerra Compliance workflows and portal workflows are examples of the types of workflows which can be constructed from the Workflow components and incorporated into applications.

Figure 3B:
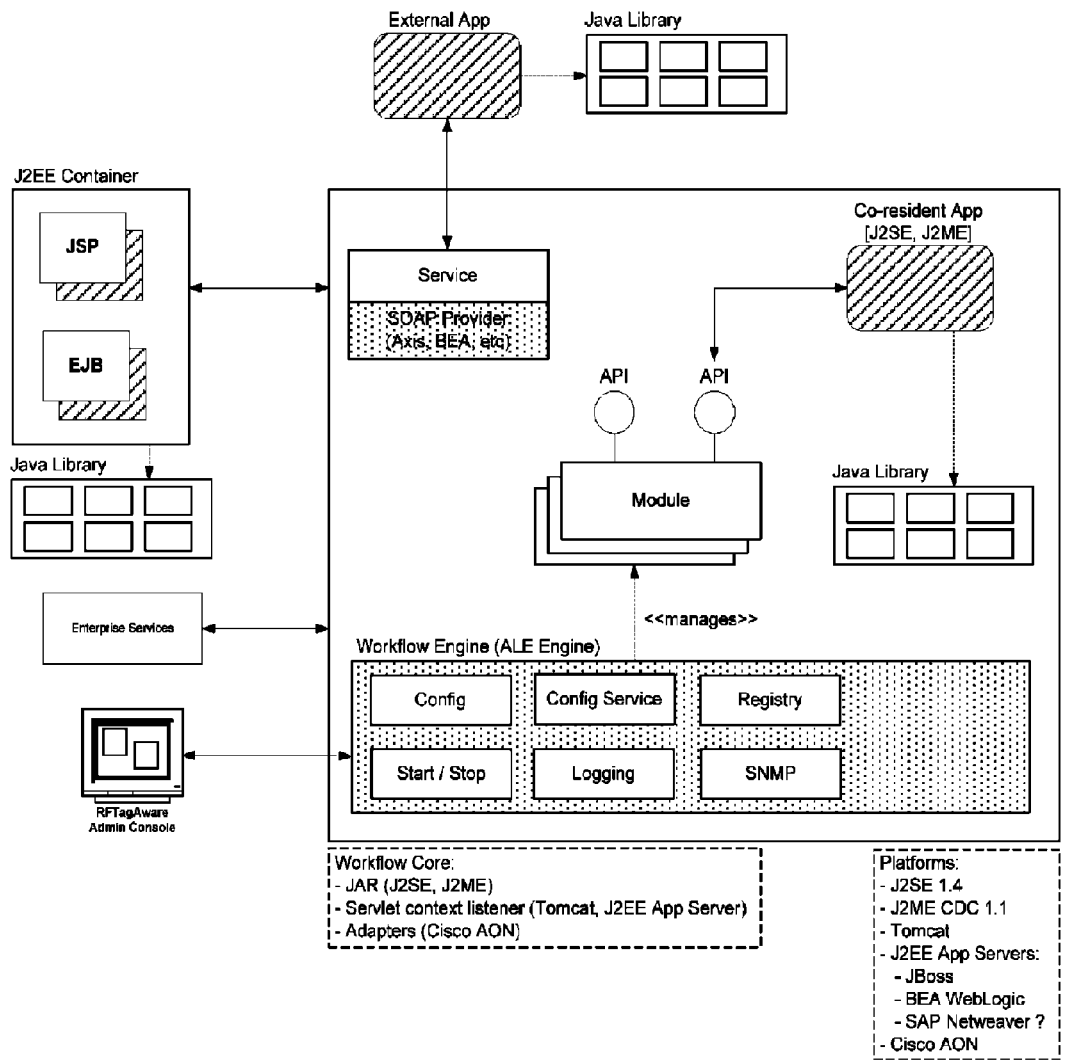

FIG. 3B shows a workflow framework overview. The framework components can be the software components which provide the infrastructure and engine for running the workflow applications.

Figure 3C:
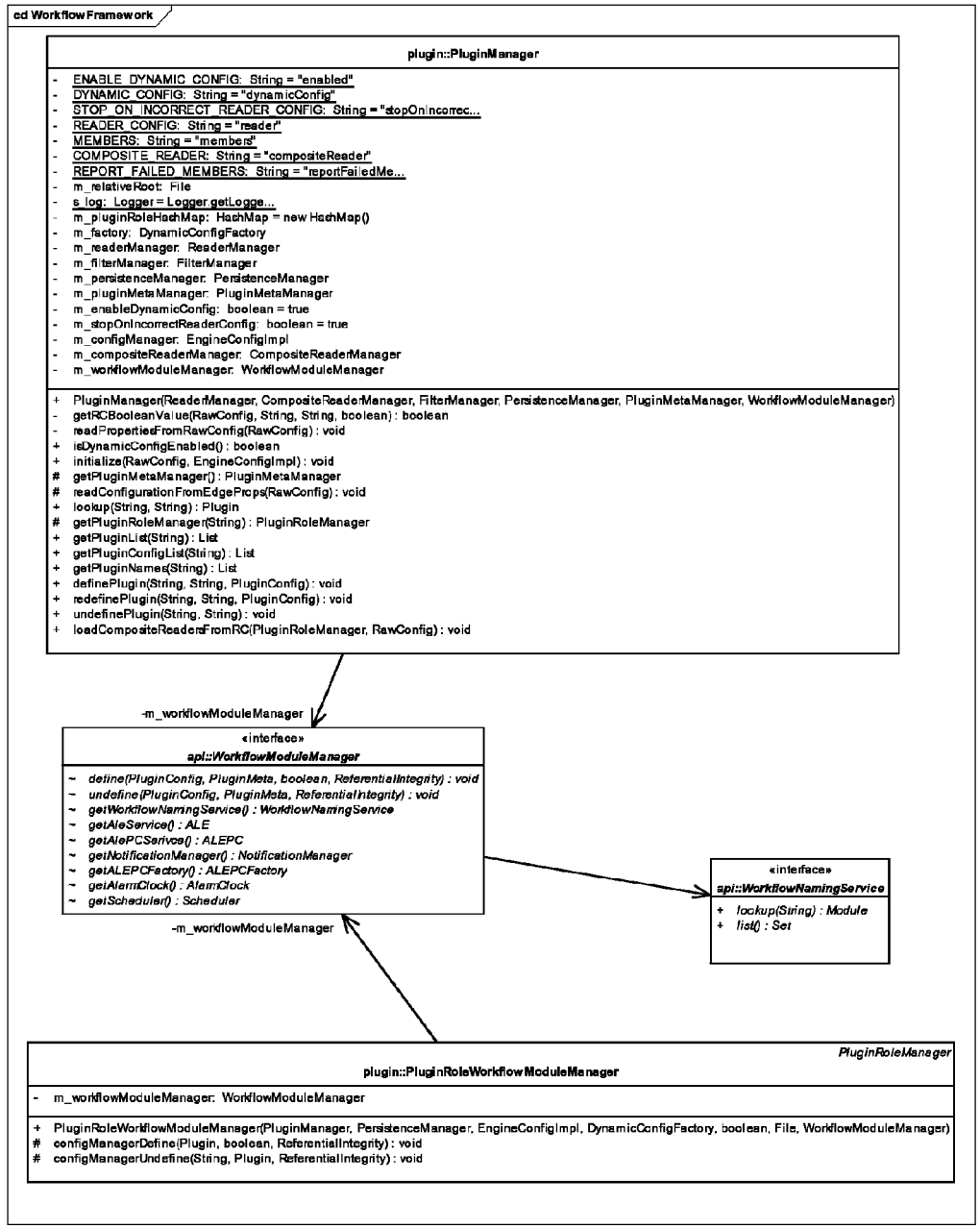

FIG. 3C shows a new Plugin Role, "workflow module," can be configured through the dynamic config framework. The plugin framework instantiates configured modules and provides a naming service to each module so the modules can interact with each other.

Figure 3D:
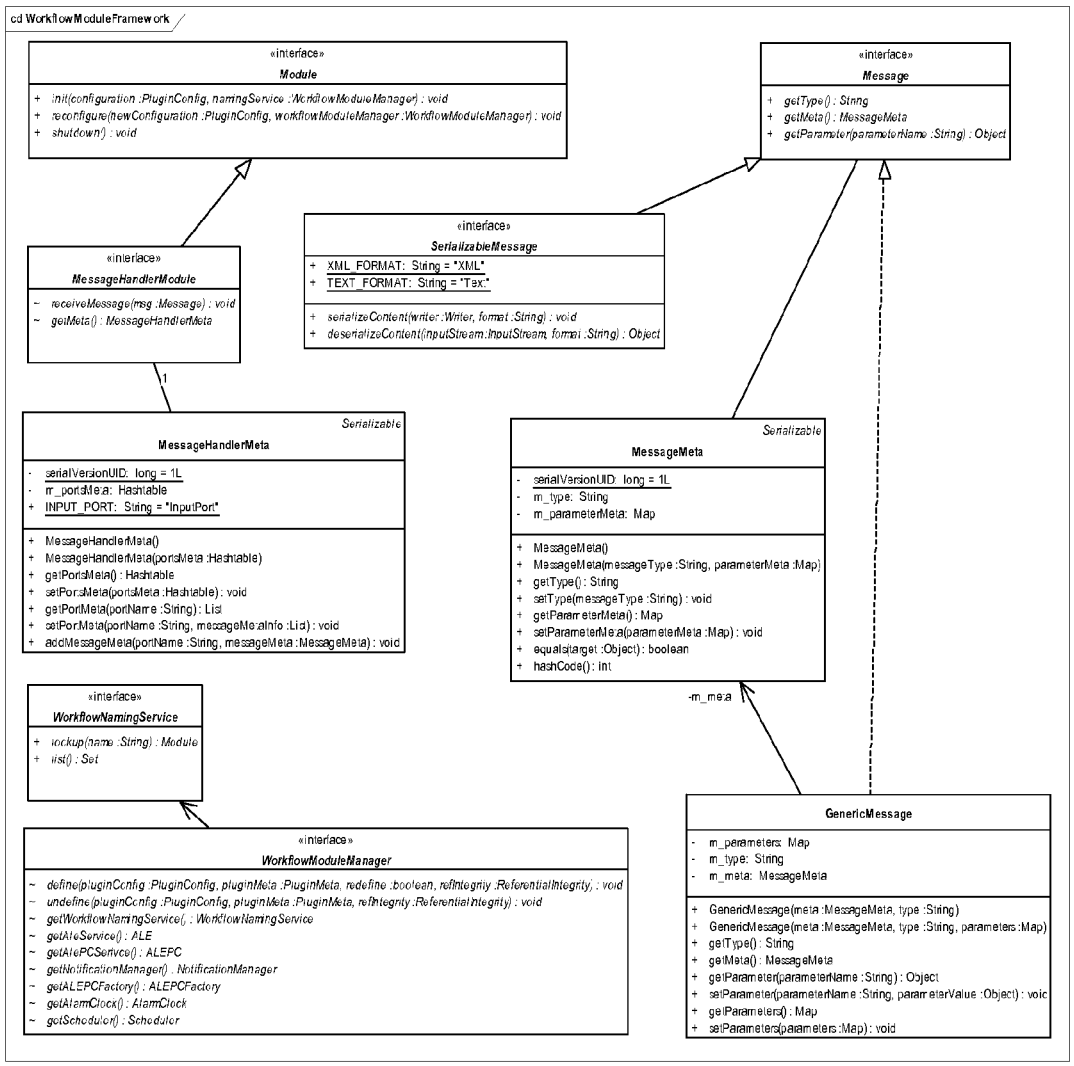

FIG. 3D illustrates a Workflow Inter-Module Message Communication Design

Figure 3E:
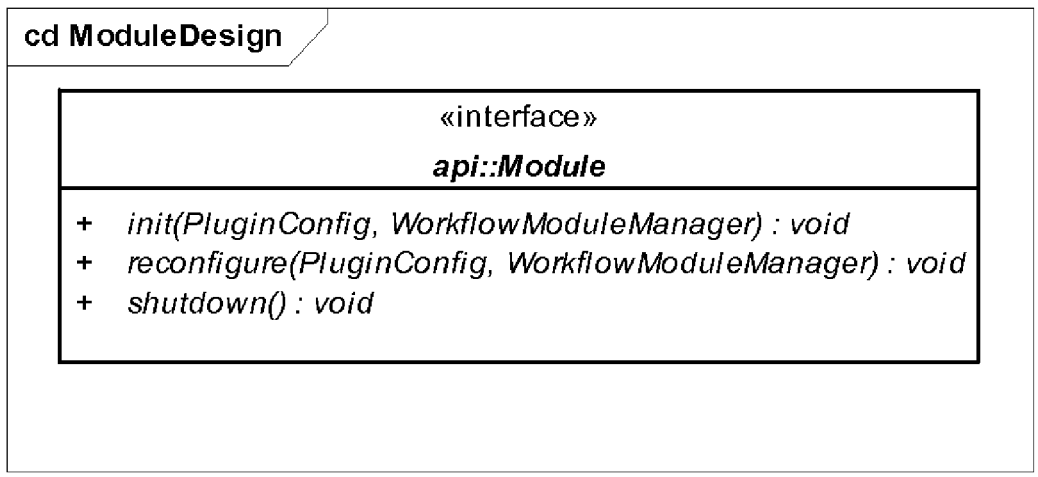

FIG. 3E shows a workflow module interface. This Workflow module can implement the Module interface can be the hooks the Workflow infrastructure uses to configure the module and inform the module of changes. In addition to the methods in the interface, the Workflow infrastructure can use reflection to instantiate any Module—it can provide a constructor of the form:
public Module ( );
i.e. a public constructor that takes no parameters.
com.connecterra.workflo-
w.engine.api.WorkflowNamingService.

Figure 3F:
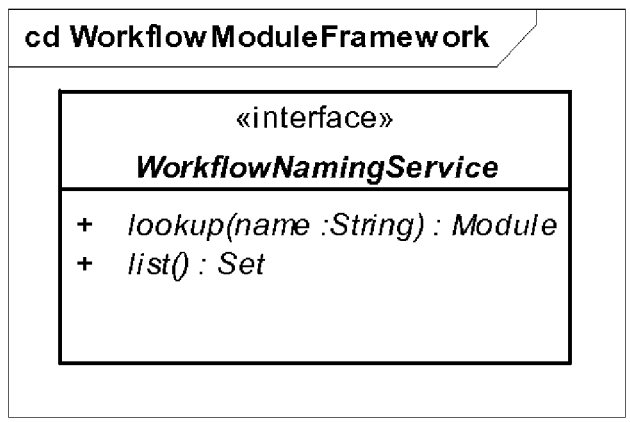
Figure 3G:
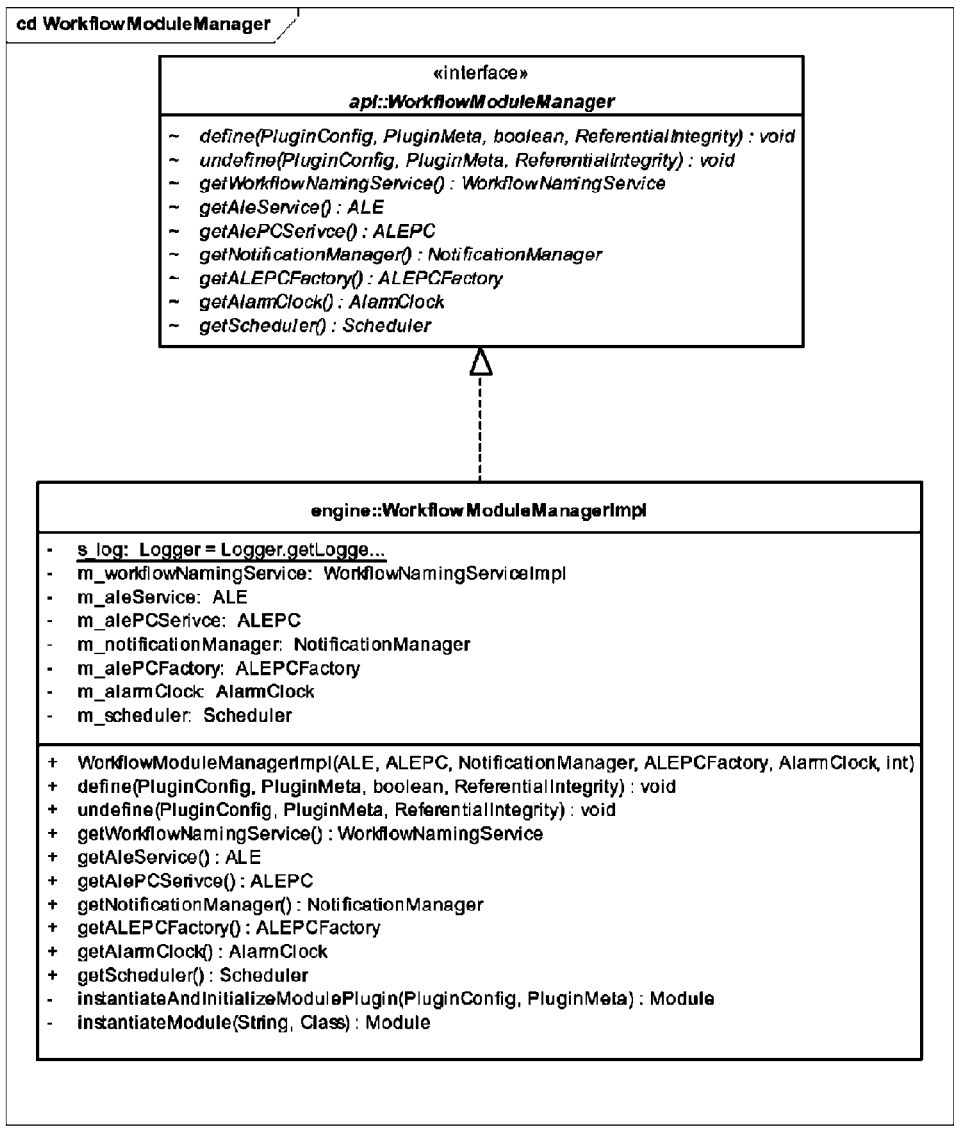

FIG. 3F shows a workflow naming service interface that defines the services a Workflow Naming Service can provide. The framework takes responsibility for providing a WorkflowNamingService to Modules in their init( ) method.

This class maintains the mapping between workflow module names and their corresponding Module objects. It also implements the WorkflowNamingService interface, and Modules use this object as their naming service.

A PluginRoleWorkflowModuleManager Class can act as an adapter layer for the WorkflowModuleManager, extending PluginRoleManager and passing calls through to the WorkflowModuleManager. PluginRoleManager can be an abstract PluginAPI class.

Exemplary workflow modules are discussed below: A LabelGenerator can Generate PC Spec for Standard Business Objects.
  Configuration Items:
    1. Default template Id for Case and Pallet
    2. Product Catalog module name
    3. Label template catalog module name
    4. Tagging station Id
    5. Default no of print trials
    6. Provisioning service module name
    7. Printer Name for which label would be generated
    8. listener modules for send and receive type ports
  Operation "generateEPCLabel"
  Input Message (LabelGeneratationRequestMessage):
    1. labelParameters→Map.class(Product/Case related parameter, PrinterName, Label template parameters)
  Processing:
    Create ALEPC client connection
    Create new cache if does not exist for GTIN(We did not see case for epc known case)
    Build label parameters using available parameters like station id, product etc on top of label template parameters passed by user.
    Update template variables with available label template parameter values like destination info (address, dest.id . . . ), Product details, Orderid . . . or whatever else user passed as key value pair.
    Set PCSpec parameters like EPC URI if single label, Label parameters, printer name, print trial count, printer specific script etc.
    Return updated PCSpec
  Output Message1(LabelGenerationSuccess):
    1. Original Input Message
    2. PCSpec→LabelGeneratationRequestMessage.class (ALE object)
    3. LabelParameters→Map.class Map of label parameters that are related to Case, Pallet, template, printer etc.)
  Output Message1(LabelGenerationFailure):
    1. Original Input Message
    2. PCSpecGenerationException→PCSpecGeneration Exception.class(Error exception)
    3. ArgumentException→ArgumentException.class(Invalid arguments passed) LabelParameters→Map.class (Map of label parameters that are related to Case, Pallet, template, printer etc.)

A LabelPrinter module can write EPC label using PCSpec and Label parameters.
  Configuration Items
    1. ALEPCConnectionURL→ALEPC URI for ALEPC service.
    2. PrinterName→Default logical printer name for label printing
  Operation "print"
  Input Message (PrintRequest):
    1. RequestedLabel→EPCLabel which is made up of PCSpec and labelparameter map object(case, pallet, label template related parameters as key value pairs)
    2. LabelPrintCount→quantity of label to print
  Processing:
    Call immediate on ALEService passing PCSpec as many times as label count Build Write status for result in case of error or success Store status in particular status object. If argument is invalid or connection to edgeserver fails declare error Output Message (PrintSuccess):
1. SourceMessage→Original request message that will allow client to check which request this result belongs to.
2. WriteStatus→Result of writing label with specified quantity Output Message (PrintFailure):
1. SourceMessage→Original request message that will allow client to check which request this result belongs to.
2. WriteException→Error condition details that made it impossible to even attempt writing. For example ALE-Connection is broken or some webservice related Remote exception encountered.
3. ArgumentException→Error condition details that raised as a result of invalid arguments A PalletBuilder module can be used to manage pallets.
Configuration Items
  Enterprise service provider Module (PalletListmanager, and other catalog service modules)
  Local service configuration items like context factory name, Provider URL, JNDI name Pallet object can provide core library type functionality so client can start pallet, check against manifest for GTIN validation and count validation etc using Pallet object and so would not need module for those operations. This module need not worry about persistence of pallet object. This can be handled by PalletList module (addUpdatePallet method potentially).

Message "addCase"
Input: Pallet object, Case object, Comment (could be rework comment in case of rework)
Processing:
  Check if current pallet is in completed or in rework state and if so then return error declaring that it is not allowed.
  Check to make sure it is not a duplicate case for addition.
  Add case to pallet.
  Update actual case count.
Output: None or Error condition
  Message "deleteCase"
Input: Pallet object, Case object, comment (could be rework comment in case of rework)
Processing:
  Make sure that pallet is in rework mode otherwise declare error.
  If actual case count is zero declare error for delete operation.
  Create rework information using input and other available information
  If pallet is in rework completion mode then Get case pallet association broker and register case deletion event with rework information otherwise delete case from pallet.
  Update actual case count.
Output: None or Error condition
  Message "completePallet"
Input: pallet
Processing:
  If pallet is in rework or waiting state declare error.
  If it is in "In progress" state, build case pallet association by using case pallet association broker service.
  Change state of pallet to "Completed".
Output: None or Error Condition.

Message "is CaseExpected"
Input: GTIN/Case, Pallet
Processing:
  Retrieve GTIN for case if not available.
  Manipulate pallet spec and get qty expected for specified GTIN.
  If GTIN is not in expected GTIN list return false.
  Manipulate pallet object and get actual quantity for specified GTIN.
  If expected qty is greater than actual then return true else false.
Output: True if case expected otherwise false or Error Condition
  Message "is PalletExpected"
Input: SSCC/Pallet/PalletSpec
Processing:
  Retrieve SSCC for pallet if not available.
  Check if there exist palletspec and/or pallet object matching with SSCC provided.
  If palletspec and/or pallet found return true else false.
Output: True if pallet expected otherwise false or Error Condition A PalletList Manager can
  Manages pallet and case related operations. For example Pallet creation, add delete pallet operations.
Configuration Items
  Local service configuration items like context factory name, Provider URL, JNDI name for accessing local persistence objects like pallet, case, etc
  Message "addPalletList"
Input: Pallet collection
Processing:
  Using pallet manager service, persist pallet collection to persistence storage
Output: None or Error Condition
  Message "addPalletList"
Input: PalletSpec collection
Processing:
  Create Pallet instance for each palletspec.
  Using pallet manager service, persist pallet collection to persistence storage
Output: None or Error Condition
  Message "addPallet"
Input: Pallet
Processing:
  Using pallet manager service, add pallet object in persistence storage.
Output: None or Error Condition
  Message "addPallet"
Input: PalletSpec
Processing:
  Create Pallet object with waiting state for specified palletspec.
  Using pallet manager service, add pallet object in persistence storage.
Output: None or Error Condition
  Message "addUpdatePallet"
Input: Pallet
Processing:
  Add or update pallet instance.
Output: None or Error Condition
  Message "getPallet"
Input: SSCC
Processing:
  Using pallet manager service, get pallet object that map to SSCC string.
Output: Pallet object or Error Condition
  Message "getPalletList"
Input: None Processing:
   Using pallet manager service, retrieve pallet list
Output: PalletList or Error Condition
Note: This message is serving admin functionality and is questionable to be here as module message
   Message "clearPalletList"
Input: None
Processing:
   Using pallet manager service, delete entire pallet list
Output: None or Error Condition
   Message "deletePallet"
Input: SSCC
Processing:
   Using pallet manager service, delete pallet matching with SSCC
Output: None or Error Condition
Note: This message is serving admin functionality and is questionable to be here as module message
   Order Manager
      Manages order related operations. For example Order creation, start stop order processing and pallet operations within scope of order.
      Configuration Items
      PalletList manager name
      Message "create"
Input: Order spec
Processing:
   Not scoped out yet.
     Output: Order or Error Condition
     CasePalletVerifier can also be used
Configuration
   String ECSPEC_NAME
Input Data
   Case case -or-
   Pallet pallet
   Input Messages

---

1. Verify Case Message
   MessageType = "VERIFY_CASE"
   MessageMeta:

| ParameterName | ParameterType |
|---|---|
| Case | ...workflowapi.Case |

2. Verify Case Message
   MessageType = "VERIFY_PALLET "
   MessageMeta:

| ParameterName | ParameterType |
|---|---|
| Pallet | ...workflowapi.Pallet |

---

API business methods
Synch Methods:
   boolean verifyCase(Case caseObj)
   boolean verifyPallet(Pallet pallet)
   processMessage(Message message)—delegates to the asynch methods
Asynch Methods:
   void verifyCaseRequest(Case caseObj)—delegates to verifyCase( )
   void verifyPalletRequest(Pallet pallet)—delegates to verifyPallet( )
Processing:
   Get ALE connection from the WorkflowModuleManager
   Call 'immediate(ecspec)' on ALE; get ECReports back
   Verify that we read a correct EPC
   Return 'TRUE' if it is correct, "FALSE" otherwise
   Output Ports and Messages

---

Port 1:
   1. Case Verification Success message
   MessageType = "CASE_VERIFY_SUCCESS"
   MessageMeta:

| ParameterName | ParameterType |
|---|---|
| Case | ...workflowapi.Case |

2. Case Verification Failure message
   MessageType = "CASE_VERIFY_FAILURE"
   MessageMeta:

| ParameterName | ParameterType |
|---|---|
| case | ...workflowapi.Case |
| exception | ...workflowapi.VerificationException |

3. Pallet Verification Success message
   MessageType = "PALLET_VERIFY_SUCCESS"
   MessageMeta:

| ParameterName | ParameterType |
|---|---|
| pallet | ...workflowapi.Pallet |

4. Pallet Verification Failure message
   MessageType = "PALLET_VERIFY_FAILURE"
   MessageMeta:

| ParameterName | ParameterType |
|---|---|
| pallet | ...workflowapi.Pallet |
| exception | ...workflowapi.VerificationException |

---

StackLight module can also be used:

| Configuration | | | |
|---|---|---|---|
| ParameterName | Parameter Type | Required (True/False) | Default if applicable |
| Stack Light Name | String | True | |
| SetStackLightSuccess Port Listeners | String | False | |
| SetStackLightFailure Port Listeners | String | False | |

Device Name CAN map to module instance name because there would be one module instance per stack light physical device.

Figure 3H:
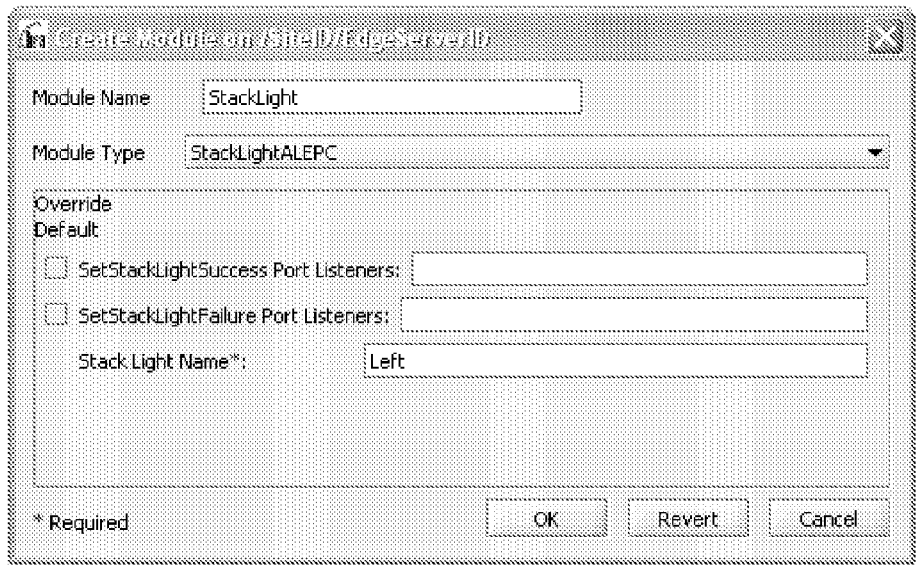

FIG. 3H shows a user interface for creating a module.

Input Data
   StackLightColor lightColor
   long stackLightTimeout
   String stackLightAction
Input Messages
   Set StackLight Message
   MessageType="SetStackLight"
   MessageMeta:

| ParameterName | ParameterType |
|---|---|
| lightColor | StackLightColor |
| stackLightTimeout | long |
| StackLightAction(ON/OFF/BLINK..etc) | String |

API Business Methods
Synch Methods:
   boolean setStackLight(lightColor, stackLightTimeout, stackLightAction)
processMessage(Message message)—delegates to the asynch methods
Asynch Methods:
   void setStackLightRequest(lightColor, stackLightTimeout, stackLightAction)
   Processing:
     get connection to ALEPC from the WorkflowModuleManager crate stacklight URI based on the parameters passed
call immediate( ) on the ALEPC, get PCWriteReport back
verify that the call succeeded
Return 'TRUE' if the call finished Ok, "FALSE" otherwise
Output Ports and Messages

```
Port 1:
    1. Success message
    MessageType = "SetStackLightSuccess"
    MessageMeta:
        ParameterName      ParameterType
        originalMessage    ...workflowapi.Message
    2. Failure message
    MessageType = "SetStackLightFailure"
    MessageMeta:
        ParameterName      ParameterType
        originalMessage    ...workflowapi.Message
        exception          ...workflowapi.WorkflowException
```

Case Provider module can be used.
Configuration Items
Enterprise Services URL or Enterprise Services Configuration name—provides access to the product catalog.
ECSpec List—a list of ECSpec names
Message "go"
Input: no parameters, just the message itself
Processing:
Begin each ECSpec running in parallel (barcode and EPC ECSpecs allowed)
Wait for all ECSpec polls to complete
Examine merged list of returned URIs:
  if empty, output error condition
  if conflicting URIs are found, output error condition
  look up product from product code extracted from EPC or barcode URI
Stuff product into new case object
Output: case object, or error condition
A Pallet Provider module can be used.
Configuration Items
ECSpec List—list of ECSpec Names
Message "go"
Input: no parameters, just the message itself
Processing:
Begin each ECSpec running in parallel (barcode and EPC ECSpecs allowed)
Wait for all ECSpec polls to complete
Examine merged list of returned URIs:
  if empty, output error condition
  if conflicting URIs are found, output error condition
  determine type of pallet from identification information read (SSCC only in rev 1—SGTIN allowed in future?)
  return appropriate EPC value (SSCC URI only, for now)
Output: URI, or error condition
A PLC Interface module can be used.
Configuration Items
PLC-Specific configuration items, like OPC service URL
Transaction specifications—subtrees in the Plugin Config, each of which has:
  Transaction type (Register change, register read, HK-style transaction)
  Type-specific information (register numbers, that sort of thing)
Message "invoke"
Input: name of transaction specification to interact with
Processing:
Look up configured transaction specification and perform accordingly.

Output: Integer value as determined by the specific transaction
An EPCIS Aggregation Event Generator module can be used.
Message "generate"
Input: Pallet in Progress object
Processing:
Transform contents of Pallet in Progress object into an EPCIS Event object containing an "aggregate" event.
Output: EPCIS Event Object (an XML Object descendent)
An EPCIS Commission Event Generator module can be used.
Message "generate"
Input: WriteStatus
Processing:
Transform input into an EPCIS Event object containing an "object" event.
Output: EPCIS Event Object (an XML Object descendent)
A WFMessage Notifier Module can be used.

| | Configuration | | |
| --- | --- | --- | --- |
| ParameterName | Parameter Type | Required (True/False) | Default if applicable |
| Destination URI | String | True | |
| XSLT File Name | String | false | |
| Serialization Format | String | false | 1000 |
| NotificationFailure Port Listeners | String | False | |
| NotificationSuccess Port Listeners | String | False | |

Figure 3I:
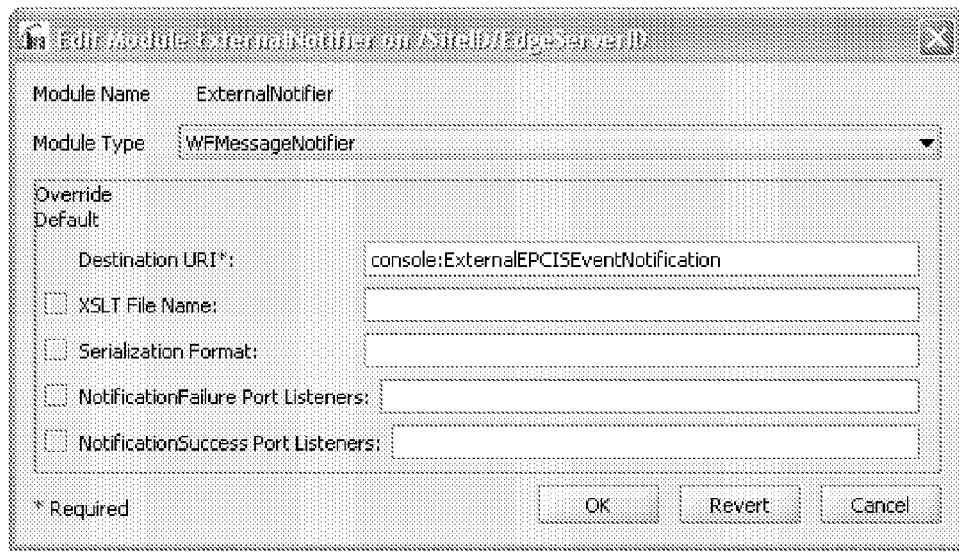

FIG. 3I shows an example of an interface for editing a module.
List of:
String Destination_URI
String SerializationFormat
String XSLFileName
Input Data
SerializableMessage
Input Messages
Any workflow message that implements SerializableMessage interface and, thus, implements the serialize (Writer w, String serializationFormat) method
API Business Methods
Synch Methods:
  boolean doNotification(SerializableMessage message)
  processMessage(SerializableMessage message)—delegates to the asynch method doNotificationRequest
Asynch Methods:
  void doNotificationRequest(Message message)—delegates to doNotification ( )
Processing
  get NotificationManager from the WorkflowModuleManager
  get an RFTA Notification Driver (and Writer) from the NotificationManager based on the configured URI
  serialize incoming message into a specified format by calling SerializableMessage.serialize(format) method
  if an XSL file is specified for this destination URI—transform the message
  send the message via the RFTA Notification Writer
  Output Ports and Messages

```
Port 1:
    Notification Success message
    MessageType = "NOTIFICATION_SUCCESS"
    MessageMeta:
        ParameterName      ParameterType
        Message            ...workflowapi.Message
        destinationURI     String
        serializationFormat String
        xslFileName        String
    Notification Failure message
    MessageType = "NOTIFICATION_FAILURE"
    MessageMeta:
        ParameterName      ParameterType
        Message            ...workflowapi.Message
        destinationURI     String
        serializationFormat String
        xslFileName        String
        exception          ...workflowapi.NotificationException
```

A DataDisplay(LED) module can be used.

Configuration

| ParameterName | Parameter Type | Required (True/False) | Defaults (if applicable) |
|---|---|---|---|
| Device Driver Class Name | | | com.connecterra.datadisplay.displaytypes.EDI111LEDDisplay |
| Device Host | String | True | |
| Device Port | Numeric | True | |
| Device Connection Timeout | Numeric | False | 1000 |
| DataDisplaySuccess Port Listener | String | False | |
| DataDisplayFailure Port Listener | String | False | |

Device Name can map to module instance name because there would be one module instance per data display (LED) physical device. If ALEPC type device connection then ALEPC URI can be added to configuration.

Figure 3J:
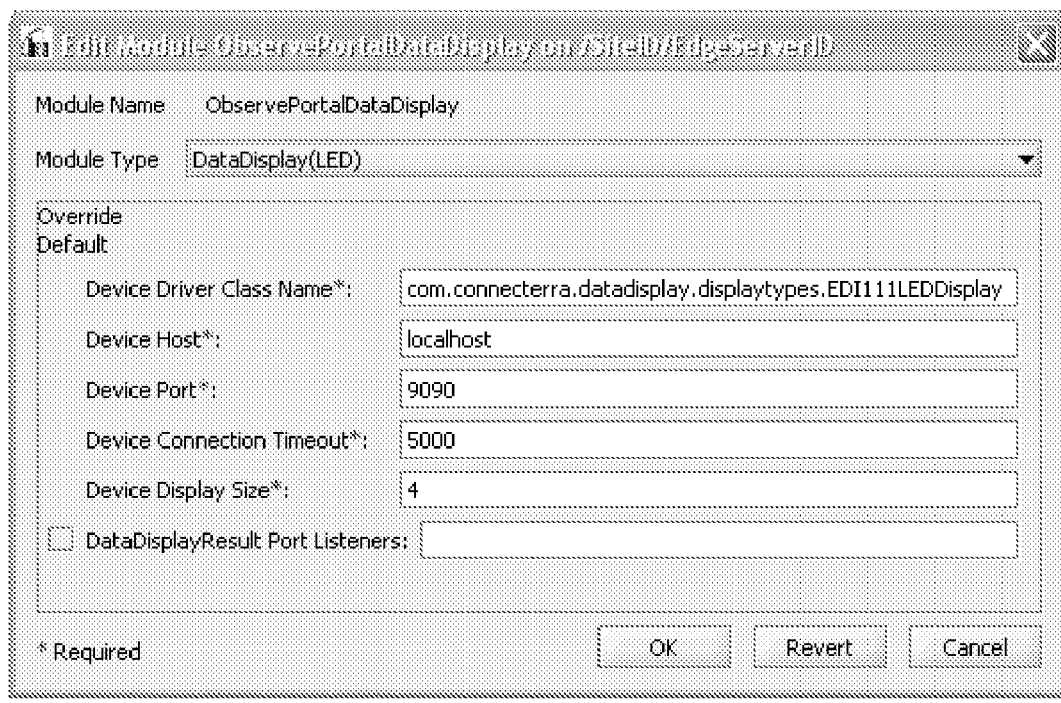

FIG. 3J shows an interface for modifying a data display module.

Input Port Messages
Port "InputPort"

```
DataDisplayRequestMessage/GenericMessage
    MessageType = "DataDisplayRequest "
    MessageMeta:
        ParameterName       ParameterType
        DisplayValue        String
        DisplayDuration     long
        FlashDuration       long
        DataDisplayOperation DataDisplayOperation("Display",
                                                  "Flash")
```

API Business Methods
Synch Methods:
  boolean display(String value, long displayDuration
  boolean flashDisplay(String value, long displayDuration, long flashDuration)
Asynch Methods:
  void requestDisplay(DataDisplayRequestMessage dataDisplayMessage)—asynch methods
Processing:
Init:
  Create an instance of DataDisplay object(Device driver) that will be controlling device
  Verify connection to the Device
Method Implementation:
Determine DataDisplay operation ("Display" or "Flash")
  If operation is "Display", display passed value for specified displayDuration period.
  If operation is "Flash", flash passed value at specified interval for specified duration.
  Return 'TRUE' if the call finished Ok, "FALSE" otherwise
Note: instance creation and verification of device connection would also be at initialize time.
Output Ports and Messages

```
Port 1:
    1. DataDisplaySuccessMessage
    MessageType = "DataDisplaySuccess"
    MessageMeta:
        ParameterName    ParameterType
        originalMessage  DataDisplayRequestMessage
    2. DataDisplayFailureMessage
    MessageType = "DataDisplayFailure"
    MessageMeta:
        ParameterName    ParameterType
        originalMessage  DataDisplayRequestMessage
        exception        ...workflowapi.WorkflowException
```

An ObservePortal module can be used to monitor tag data traffic and generates Observe event, turns stack light and increases count on LED.

Configuration

| ParameterName | Parameter Type | Required (True/False) | Default (if applicable) |
|---|---|---|---|
| Tag Addition ECReport Name | String EPCIS | True | |
| Object Event Action | String | True | |
| Business Step URI | String | false | |
| Disposition URI | String | false | |
| Read Point URI | String | false | |
| Business Location URI | String | false | |
| Output Destinations | String Numeric Display | false | |
| Display Duration | Numeric | false | 0 |
| Tag Deletion ECReport Name | String | True | |
| Output Destinations | String Stack Light | False | |
| Display Duration | Numeric | False | 0 |
| Output Destinations | String | False | |

FIG. 3K shows an interface for modifying an observer portal module.

Operation "receiveMessage"
Input Port Messages
Port "InputPort"
ECReportNotificationMessage/GenericMessage:

```
MessageType = "ECReportNotification "
MessageMeta:
    ParameterName    ParameterType
    ECReports        com.connecterra.ale.api.ECReports
GenericMessage
MessageType = "NotificationMessage "
MessageMeta:
    ParameterName    ParameterType
    NotificationData String
```

GenericMessage can be normally submitted by Edgeserver notification driver using receiveMessage(Message).

API Business Methods

Synch Methods:

Void process(ECReports ecReports);

Asynch Methods:

void receiveMessage (Message message);

Processing:

Check ecreport name and determine what type of operation was performed by edgeserver on supplied epc tags. For example add or delete. Add and Delete report name from configuration helps figuring this out.

Retrieve ECReport data from ECReports and collect list of epcs sent by ecreport.

Retrieve time stamp for report creation

If operation was addition of tags then fire ObserveEventMessage, DataDisplayMessage and StackLightMessage for each epc specified in ecreport If operation was deletion of tags then fire DataDisplayMessage and StackLightMessage for each epc specified in ecreport Manage epc count information before DataDisplayMessage is sent.

Output Port Messages:

Port "ObserveEvent"
    ObserveEventMessage :
        MessageType = "ObserveEvent "
        MessageMeta:
            ParameterName        ParameterType
            ObserveEvent         com.connecterra.epcis.api.schema.ObserveEventElement Port "DataDisplay"

DataDisplayMessage:
    MessageType = "DataDisplay "
    MessageMeta:
        ParameterName        ParameterType
        DisplayValue           String
        DisplayDuration      Long
        FlashDuration        Long
        DataDisplayOperation  DataDisplayOperation("Display", "Flash")

Port "StackLight"

Output Message (StackLight) :
    MessageType = "SetStackLight"
    MessageMeta:
        ParameterName          ParameterType
        LightColorId            Integer
        DisplayDuration       Long
        StackLightAction     com.connecterra.workflow.api.StackLightAction (ON/OFF)

A DirectionalPortal module can monitor tag data traffic between two read points and generates directional Observe event, turns stack light and increases count on LED

| Configuration | | | |
|---|---|---|---|
| ParameterName | Parameter Type | Required (True/False) | Default (if applicable) |
| Object Event Output Destinations | String | False | |
| EPCIS Read Point URI | String | False | |
| Stale Tag Timeout | Numeric | False | 180000 |
| Side A | | | |
| Tag Addition ECReport Name | String | True | |
| Tag Deletion ECReport Name | String | True | |
| Side B | | | |
| Tag Addition ECReport Name | String | True | |
| Tag Deletion ECReport Name | String | True | |
| Side A to Side B EPCIS | | | |
| Object Event Action | String | True | Observe |
| Aggregation Event Action | String | True | Observe Note: Only if aggregatin is to be calculated |
| Business Step URI | String | False | |
| Disposition URI | String | False | |
| Business Location URI | String | False | |
| Numeric Display | | | |
| Display Duration | Numeric | 0 | |
| Reset Interval | Numeric | False | 5000 |
| Output Destinations | String | false | |
| Stack Light | | | |
| Display Duration | Numeric | false | 0 |
| Output Destinations | String | false | |
| Side B to Side A EPCIS | | | |
| Object Event Action | String | true | Observe |
| Aggregation Event Action | String | true | Observe Note: Only if aggregatin is to be calculated |
| Business Step URI | String | False | |
| Disposition URI | String | False | |
| Business Location URI | String | False | |
| Numeric Display | | | |
| Display Duration | Numeric | False | 0 |
| Reset Interval | Numeric | False | 5000 |
| Output Destinations | String | False | |
| Stack Light | | | |
| Display Duration | Numeric | False | 0 |
| Output Destinations | String | False | |
| Aggregation Data | | | |
| Control Tag EPC Patterns | String | True if aggregation is to be calculated else false | |
| Parent Tag EPC Patterns | String | False | |
| Delay After Detecting Direction | Numeric | False | 0 |
| Output Destinations | String | False | |

FIG. 3L shows an interface for modifying a directional portal module.

Operation "receiveMessage"
Input Port Messages
Port "InputPort"

```
ECReportNotificationMessage/GenericMessage :
    MessageType = "ECReportNotification "
    MessageMeta:
        ParameterName      ParameterType
        ECReports          com.connecterra.ale.api.ECReports
GenericMessage
    MessageType = "NotificationMessage "
    MessageMeta:
        ParameterName      ParameterType
        NotificationData   String
```

Figure 3M:
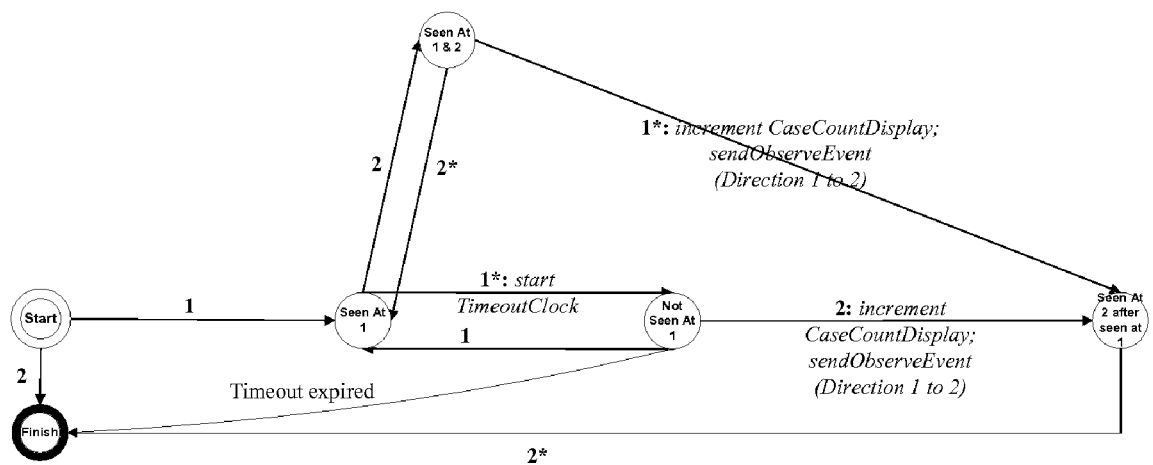

GenericMessage is normally submitted by Edgeserver notification driver using receiveMessage(Message)
API Business Methods
Synch Methods:
  void process(ECReports ecReports);
Asynch Methods:
  void receiveMessage(Message message);
  Processing:
  Check ecreport name and determine what type of operation was performed by edgeserver at what point on supplied epc tags. For example add or delete at point 1 or 2. Add and Delete report name from configuration helps figuring this out. If report name does not match with any of configured add/delete report name for any location then report error and skip report.
  Retrieve list of epcs sent by ecreport.
  Retrieve time stamp for report creation
  Calculate message type from location info and tag operation type (addition/deletion) and retrieve tag entry for this tag. For reverse state calculation we need to reverse message type and use this reversed message type for state update. Update state information for forward and reverse state table as follows,
  State Transitions:
  FIG. 3M shows a state machine for a directional portal module.
  State Machine

| Message Type + | CurrentTagState = | Result tag state, message if necessary |
|---|---|---|
| 1. TagAdditionAt1 + | Start = | SeenAt1 |
| 2. TagAdditionAt1 + | NotSeenAt1 = | SeenAt1 |
| 3. TagDeletionAt1 + | SeenAt1 = | NotSeenAt1, Start counting timeout for end conition check |
| 4. TagDeletionAt1 + | SeenAt1and2 = | SeenAt2AfterSeenAt1, Direction determined send messages |
| 5. TagAdditionAt2 + | Start = | Finish, Remove tagEntry from state table since we are done |
| 6. TagAdditionAt2 + | SeenAt1 = | SeenAt1and2 |
| 7. TagAdditionAt2 + | NotSeenAt1 = | SeenAt2AfterSeenAt1, Direction determined send messages |
| 8. TagDeletionAt2 + | SeenAt1and2 = | SeenAt1 |
| 9. TagDeletionAt2 + | SeenAt2AfterSeenAt1 = | Finish, Remove tagEntry from state table since we are done |
| 10. Expired + | NotSeenAt1 = | (if same activation serial no then)Finish, Remove tagEntry from state table since we are done (if activation serial is different) don't do anything |

If tag direction is determined fire ObserveEventMessage, DataDisplayMessage and StackLightMessage. If directional aggregate event is to be calculated then add this tag to aggregator and check if current tag is parent tag by comparing with configured parent tag pattern. If parent tag then check if delay for aggregate event and fire up aggregate event as per configured delay. Delay time allows to collect more child tags if they are not added to aggregator yet.

Manage epc count information by running reset manager thread that will start counting time out after last count update and at timeout reset data display count.

Output Port Messages:

Port "ObserveEvent"

```
ObserveEventMessage :
    MessageType = "ObserveEvent "
    MessageMeta:
        ParameterName      ParameterType
        ObserveEvent       com.connecterra.epcis.api.schema.
                           ObserveEventElement
```

Port "AggregateEvent"

```
AggregateEventMessage :
    MessageType = "AggregateEvent "
    MessageMeta:
        ParameterName      ParameterType
        AggregateEvent     com.connecterra.epcis.api.schema.
                           AggregateEventElement
```

Port "DataDisplay"

```
DataDisplayMessage:
    MessageType = "DataDisplay "
    MessageMeta:
        ParameterName         ParameterType
        DisplayValue          String
        DisplayDuration       Long
        FlashDuration         Long
        DataDisplayOperation  DataDisplayOperation("Display",
                                                  "Flash")
```

Port "StackLight"

```
Output Message (StackLight) :
    MessageType = "SetStackLight"
    MessageMeta:
```

-continued

| ParameterName | ParameterType |
|---|---|
| LightColorId | Integer |
| DisplayDuration | Long |
| StackLightAction (ON/OFF) | com.connecterra.workflow.api.StackLightAction |

PalletPortal module can monitor tag data traffic and generates Aggregation event, turns stack light and increases count on LED.

| Configuration | | | |
|---|---|---|---|
| ParameterName | Parameter Type | Required (True/False) | Default (if applicable) |
| ECReport Name | String | True | |
| Control Tag Patterns | String | True | |
| Pallet Tag Patterns | String | True | |
| Transitions | | | |
| Start Pallet Timeout | Numeric | False | |
| End Pallet Timeout | String | True | |
| Start Case Timeout | String | False | |
| End Case Timeout | String | False | |
| Empty ECReport Count | String | False | 5 |
| EPCIS | | | |
| Aggregation Event Action | String | True | |
| Business Step URI | String | false | |
| Disposition URI | String | False | |
| Read Point URI | String | False | |
| Business Location URI | String | False | |
| Output Destinations | String | false | |
| Numeric Display | | | |
| Display Duration | Numeric | False | 0 |
| Output Destinations | String | False | |
| Stack Light | | | |
| Display Duration | Numeric | False | 0 |
| Output Destinations | String | false | |

FIG. 3N shows an interface to modify a pallet portal module.

Operation "receiveMessage"
Input Port Messages
Port "InputPort"

```
ECReportNotificationMessage/GenericMessage :
    MessageType = "ECReportNotification "
    MessageMeta:
        ParameterName      ParameterType
        ECReports          com.connecterra.ale.api.ECReports
GenericMessage
    MessageType = "NotificationMessage "
    MessageMeta:
        ParameterName      ParameterType
        NotificationData   String
```

GenericMessage can be normally submitted by Edgeserver notification driver using receiveMessage(Message).
API Business Methods
Synch Methods:
  Void process(ECReports ecReports);
Asynch Methods:
  void receiveMessage (Message message);
Processing:
Check ecreport name and determine what type of operation was performed by edgeserver on supplied epc tags. For example add or delete. Add and Delete report name from configuration helps figuring this out.
Retrieve ECReport data from ECReports and collect list of epcs sent by ecreport.
Retrieve time stamp for report creation
If operation was addition of tags then fire ObserveEventMessage, DataDisplayMessage and StackLightMessage for each epc specified in ecreport
If operation was deletion of tags then fire DataDisplayMessage and StackLightMessage for each epc specified in ecreport
Manage epc count information before DataDisplayMessage is sent.
Output Port Messages:

```
Port "ObserveEvent"
    ObserveEventMessage :
        MessageType = "ObserveEvent "
        MessageMeta:
            ParameterName      ParameterType
            ObserveEvent       com.connecterra.epcis.api.schema.
                               ObserveEventElement
```

Port "DataDisplay"

```
DataDisplayMessage:
    MessageType = "DataDisplay "
    MessageMeta:
        ParameterName          ParameterType
        DisplayValue           String
        DisplayDuration        Long
        FlashDuration          Long
        DataDisplayOperation   DataDisplayOperation("Display",
                               "Flash")
```

Port "StackLight"

```
Output Message (StackLight) :
    MessageType = "SetStackLight"
    MessageMeta:
        ParameterName          ParameterType
        LightColorId           Integer
        DisplayDuration        Long
        StackLightAction       com.connecterra.workflow.api.StackLightAction
        (ON/OFF)
```

Figure 4A:
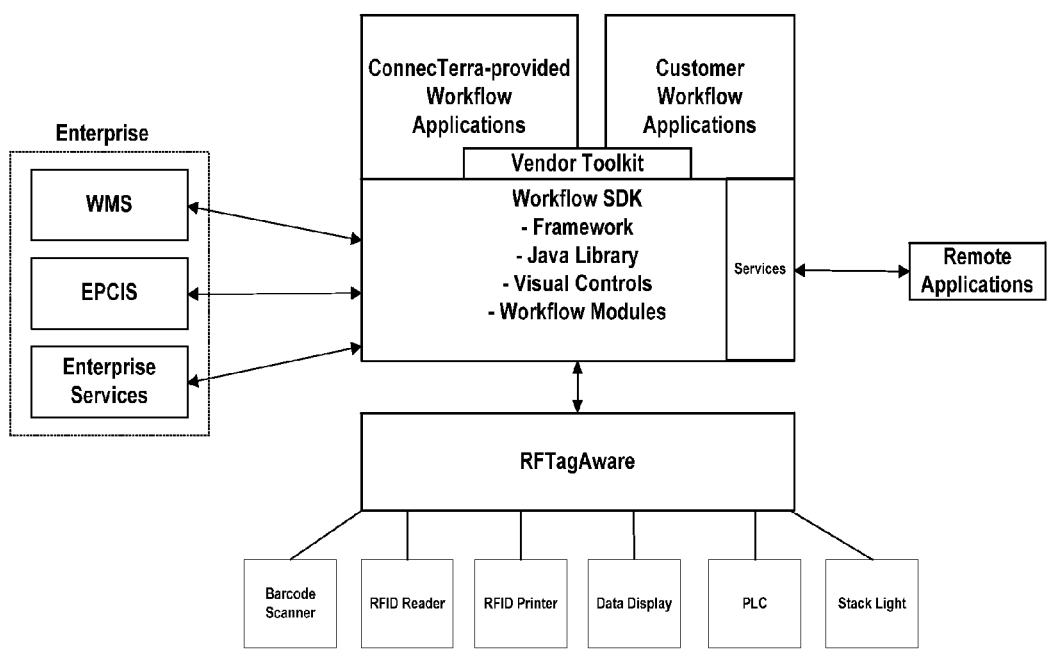

A Workflow Software Development Kit (SDK) can provide the building blocks for rapid creation and deployment of workflow applications which access RFID devices through RFID edge servers, such as RFTagAware and communicate with enterprise systems as shown in FIG. 4A:
The following key components comprise the SDK:
RFTagAware
  The base infrastructure software for tag reading and writing
Workflow SDK
  The set of libraries, deployment modules, and services for workflows
Vendor Toolkit
  Toolkit in which SDK components can be leveraged to construct workflows (e.g., page flows)
ConnecTerra-provided Workflow Applications
  Deployable applications built upon the SDK provided by ConnecTerra Compliance workflows and portal workflows are examples of the types of workflows which can be constructed from the SDK components and incorporated into applications.

Architecture

Figure 4B:
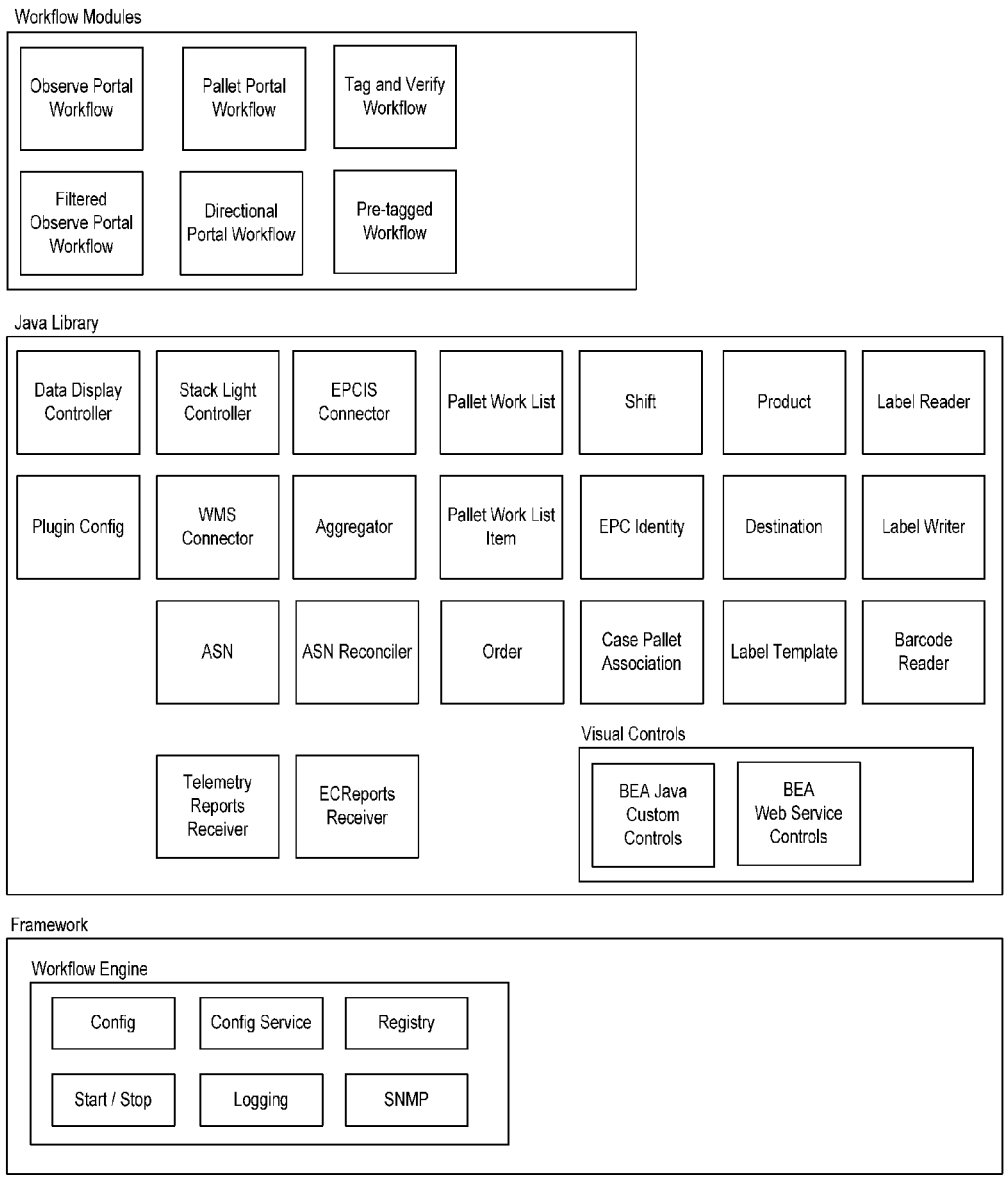
Figure 4C:
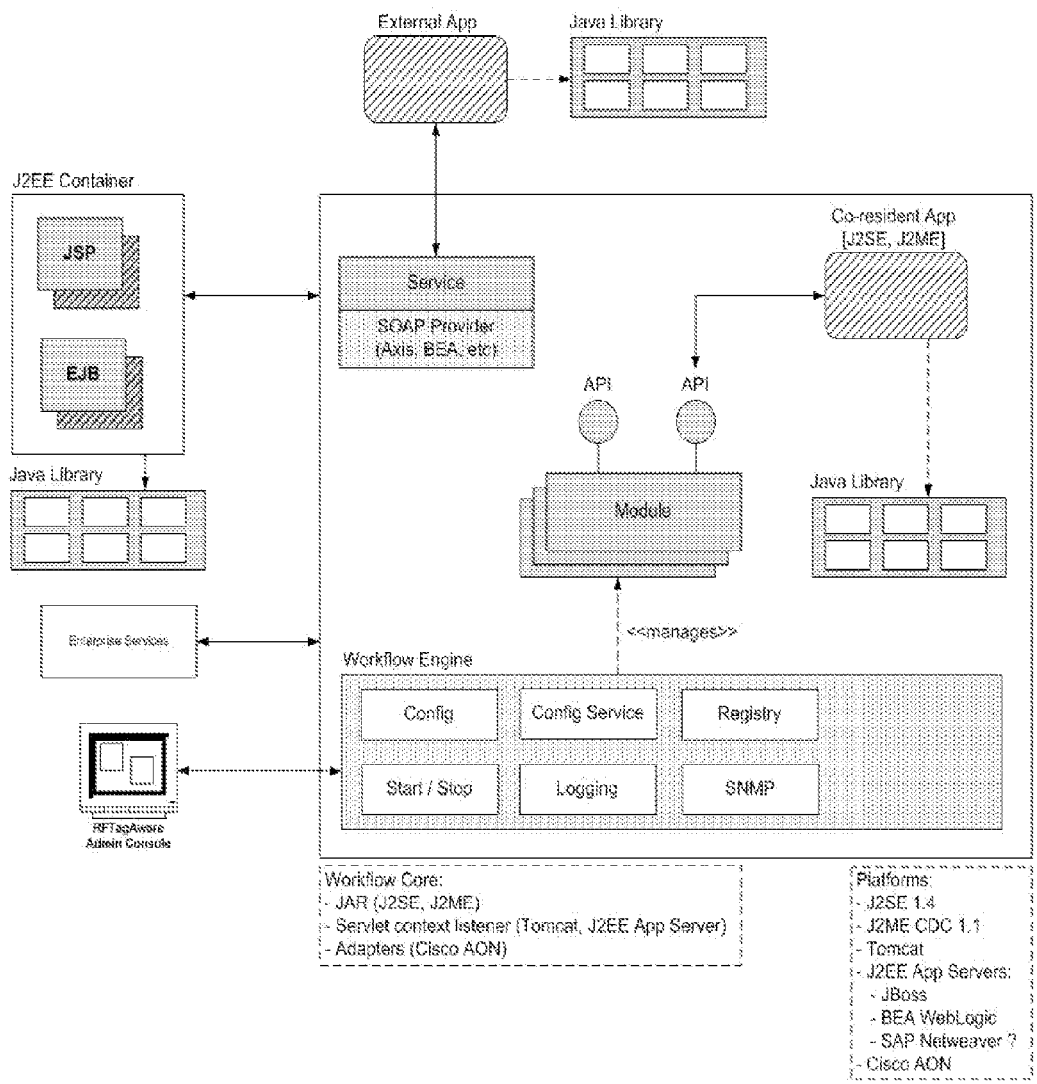

The SDK architecture can consist of a workflow framework, JAVA library components, and workflow deployment modules as shown in FIG. 4B.

The framework components that can be the software components which provide the infrastructure and engine for running the workflow applications.

The workflow engine can control the lifecycles for configured workflows (initialization, start, termination, etc.) as well as dispatches received ECReports to the appropriate workflows.

A framework component cab encapsulates an SNMP agent for network management capabilities.

This module can be configured to send SNMP alerts on the following conditions:

Reader or antenna error (unresponsive device or other conditions)

Edge server connectivity error

LED error (unresponsive or other conditions)

Local workflow error

JMS connectivity problems (i.e., cannot send JMS message to JMS server topic)

The SNMP agent can also supports the SNMPv2-MIB system group. The SNMP support can be turned on/off for each portal through the workflow configuration.

A Data Display Controller can provide control of a configured data display (i.e., LED).

A Stack Light Controller module can provide control of a configured stack light (i.e., Matrics DC-400 stack light).

A Plugin Configuration module can support configuration via the plugin framework.

A WMS Connector module can provide connectivity with a configured WMS. ASN requests can be made over configured transports (HTTP, JMS). XSL transformations can be utilized to interoperate with various WMS XML formats.

An EPCIS Connector module can provide connectivity with an EPCIS enterprise server. EPCIS capture events (i.e., observe events, aggregate events) can be sent over configured transports (HTTP, JMS). An EPCIS queries can be made to obtain EPCIS data. An ASN module can provide support for ASN operations (i.e., reconciling actual reads and expected reads in an ASN).

An Aggregator module can provide support for aggregating case/pallet information and read attribute data.

A Pallet Work List module can allow adding, updating, deleting and getting status of pallet information.

A Pallet Work List Item module can allow adding or deleting Case object from specific pallet and different case pallet relation information.

An Order module can provide support for order operations (order association, order details, etc.).

A Compliance Manager module can server as a manager to access other compliance modules like Shift Manager, Workflow Manager, Product Catalog, Destination Catalog, etc. An Company Prefix Entries module can represent a list of valid company prefixes.

A DestinationCatalogCSVReader module can provide service to read destination information from CSV file.

A LabelTemplateCSVReader module can provide service to read Label template information from CSV file.

A PalletSpecCSVReader module can provides service to read Pallet specification information from CSV file.

A ProductCatalogCSVReader module can provide service to read product catalog information from CSV file.

A WorkflowFactory module can provides service for creating instances of complex types used by the Compliance API.

A WorkflowManager module can provide service for configuring workflow parameters.

A LabelTemplateCatalogmodule can provide service to update/access the Label Template Catalog.

A Shift module can represent work time frame in the context of shop floor operation. It can allow beginning, ending and resuming current work that map to shift operation. It can also provide details about work done during shift operation.

A ShiftFactory module can provides service to create and access shift and related objects.

An EPC Identity module can allow for providing details of EPC.

A Case Pallet Association module can provide details of case pallet association. Lots of association details can be retrieved using this module.

A Product module can provide details of product for business process. It can carry key information like GTIN, SKU, and Item Code etc. A Destination module can represent Destination information. A Label Template module can provide label template information. It can allow storing stock, content for template etc key information. A Label Reader module can allows reading case or pallet tag at specified reader name and also allows passing reader parameters.

A Label Writer module can allow writing case or pallet label from different input sources passing label template and writer parameters.

A Barcode Reader module can allow reading barcodes at specified scanner name and also allows passing reader parameters.

In one embodiment, a standard observe portal workflow can support the following:

Operational process:
Operator pushes full pallet or individual cases through portal and observes LED count Workflow:
Create and send ObserveEvent for each EPC read
Update LED with current count In one embodiment, a standard pallet portal workflow can support the following:

Operational process:
Operator drives pallet jack with pallet into portal
System reads control tag (demarcates pallet mode) mounted on pallet jack
System reads cases on pallet and displays current pallet mode count
Operator observes count and drives pallet jack out of portal
Optionally, operator pushes cases one-by-one through portal
System reads individual cases in case-by-case mode and displays current case count Workflow:
Create and send AggregateEvent for EPCs read in pallet mode and case-by-case mode
For each EPC read, indicate if read in pallet mode, case-by-case mode, or both
Update LED with counts in pallet mode and case-by-case mode
Display dashes ("----") to demarcate case-by-case mode In one embodiment, a standard directional portal workflow can support the following:
Operational process:
Operator pushes "U-boat" of cases into directional portal
System reads EPCs and displays case count at furthest LED
Workflow:
Create and send ObserveEvent for EPCs read and specify directionality via business location SGLN
Reset LED after configurable interval In one embodiment, a standard filtered observe portal workflow can support the following:
Operational process:
Operator pushes full pallet or individual cases through portal and observes LED count
Workflow:
Utilize transient filters on portal reads
Create and send ObserveEvent for each EPC read
Decrement LED count for each EPC read after configured timeout interval In one embodiment, a standard pre-tagged workflow can support the following:
Operational process:
Operator selects pallet to work with and then moves case in the front of the reader.
Workflow:
Uses EPC reader to detect case arrival and considers it as potential candidate for adding it to current pallet in progress.
Create and send Case Pallet association event.
Closes the pallet when pallet completed is requested.

In one embodiment, a standard tag and verify workflow can support the following:
Operational process:
Operator selects pallet to work with and then moves case in the front of the reader.
Workflow:
Uses RFID printer to encode EPC tag and print label for case.
Uses RFID reader to verify encoded EPC tag and considers it as potential candidate for adding it to current pallet in progress.
Create and send Case Pallet association event.
Closes the pallet when pallet completed is requested.

A number of Container Components can be used.
ECReports Receiver
A WorkflowEdgeServlet container module shown in FIG. 4D can be a servlet for receiving ECReports XML from an RFID edge server. The WorkflowEdgeServlet class can extend the javax.servlet.http.HttpServlet class to process ECReports XML in an HTTP POST message.

The dispatch( ) method can default to dispatching to the WorkflowEngine class. A customer may derive this servlet class and override the protected dispatch( ) method to perform application-specific processing.

A TelemetrySubscriberServlet container module shown in FIG. 4E can be a servlet for receiving TelemetryReports XML from an RFID edge server. The TelemetrySubscriberServlet class can extend the javax.servlet.http.HttpServlet class to process TelemetryReports XML in an HTTP POST message.

The dispatch( ) method can default to dispatching to the TelemetrySubscriber class. A customer may derive this servlet class and override the protected dispatch( ) method to perform application-specific processing.

Figure 4F:
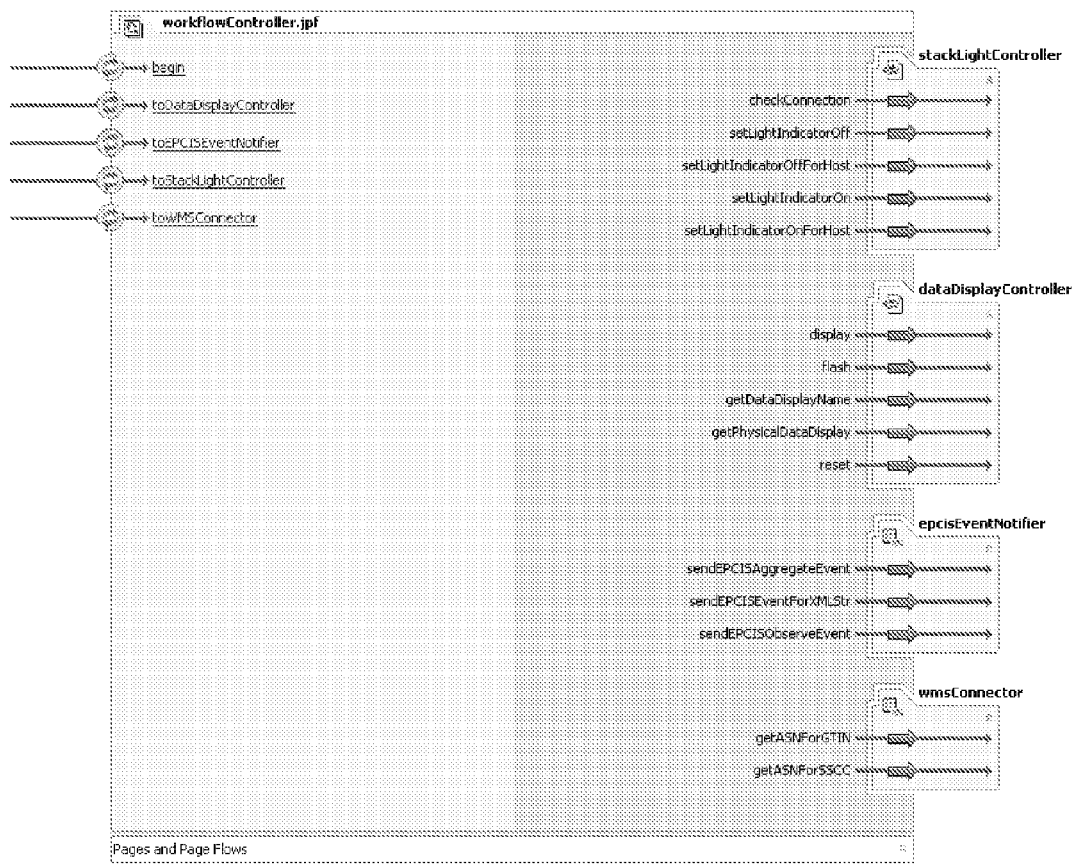

FIG. 4F illustrates exemplary JAVA custom controls.

The SDK can support following configuration properties for compliance workflow through application properties (e.g. tagging-station.props).

The SDK can support the configuration of portal workflows through application properties (e.g., workflow-edge.props). The following properties allow the user to specify the various portal workflow configuration settings:

In order to make all configured modules available to the workflow designer, the module can be accessible through naming service. In one embodiment, the modules can be expected to be accessed by direct method calls and/or using event mechanism between modules.

An Event mechanism can be considered valuable because it will allow client to tap into existing events by simply subscribing to that event. Because in some cases simple sequential workflow design between modules are desired where as most other cases event based workflow lifecycle could be used.

Each module can have capability to fire an event as well as gracefully receive module supported events. Workflow designer will have two choices for building workflow solution.
1. Using module method APIs
2. Using module event subscribe and publish mechanism Normal module lifecycle details of one embodiment:
1. Modules can come to life by workflow engine and declare what events can be generated by that module.
2. Module can subscribe to events that it is interested in by using global EventServiceProvider. Module specifies what the source of event is. It could be from specific module or it could be from any source. This subscription can be done as configuration or as runtime dynamic behavior.
3. When events are sent to this module for taking some actions or by client calling some method, it can generate results. Normally method call will return result as return value. If event trigger some action then it can generate other resultant event.
4. Generated events from the module can be submitted to global EventServiceProvider.
5. All the Event listeners that are subscribed to that event can get this event notification.

Workflow modules can be designed to fire events, consume events as well as provide method API for clients to build workflow. Module design can contain the following key design components.

The workflow Modules can be standard objects whose lifecycle is managed by workflow engine. It will provide following main capabilities,
1. Configuration
2. Starting and stopping.
3. List of event that it can generate A Naming service can be a workflow engine piece that allows client to retrieve module instance by referring it's instance name. It provides registering module by name and retrieve module by name.

Event-based communication between modules can be accomplished via direct subscriptions of event consumers to event producers. Events can be processed synchronously or asynchronously, using the AbstractEventProcessor model of ALE Engine. Subscriptions can be configured via DynamicConfig facility of the ALE Engine. There are two generic categories of events that a module can produce: success events and failure events. Accordingly, any module can subscribe to receive success and/or failure events generated by other modules. To declare its intent to receive events, a module can implement one or both of the following interfaces: WFSuccessListener, WFFailureListener.

Listener Interfaces Description
WFSuccessListener:
public void doSuccess(Map sourceInfo, String eventType, boolean processSynch);
synchronous method:
public void doSuccess(Map sourceInfo, String eventType);
asynchronous method:
public void doSuccessRequest(Map sourceInfo, String eventType);
WFFailureListener:
public void doFailure(Map sourceInfo, String eventType);
synchronous method:
public void doFailure (Map sourceInfo, String eventType);
asynchronous method:
public void doFailureRequest(Map sourceInfo, String eventType);

Parameter Description:

String eventType—this parameter further distinguishes events. It is assumed that there can be different types of both success and failure events. Event types are declared as public static Strings in the event producer module interface.

Map sourceInfo—a HashMap of parameters that an event producer module supplies. It can contain any number of (String key, Object value) pairs. String keys are declared as public static Strings in the event producer module interface. A receiver module (registered as a listener to the producer module) will know what event types it is interested in processing and will retrieve corresponding source information based on the event type.

boolean processSynch—if true—this request will be processed synchronously, by delegating work to the synchronous method, doSuccess( ) (or doFailure( )); if false—this request will be processed asynchronously, by delegating work to the asynchronous method, doSuccessRequest( ) (or doFailureRequest( )), which, in turn will delegate the work to the corresponding synchronous method.

Figure 5A:
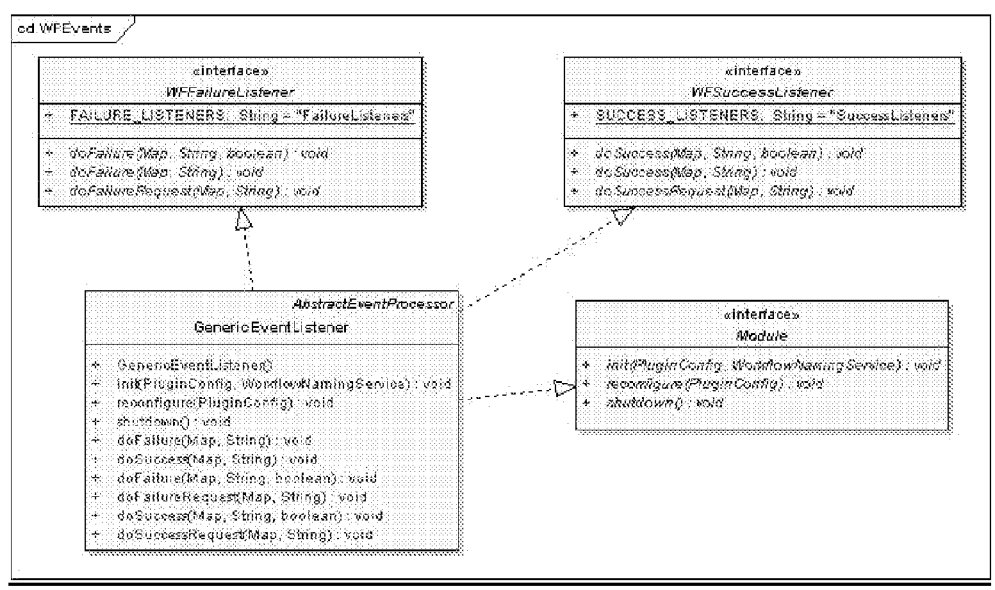
FIGS. 5A-5D illustrate elements of an RFID workflow system

Process Flow Description:
A process flow for success events is described below; a process flow for failure events is identical.
Event Producer Side:
1. upon initialization, a module can retrieve a list of listeners for its success events through Dynamic Config
2. when a success event occurs, the module can create a HashMap sourceInfo with all relevant information. It uses the static keys defined in its interface. The module also knows what particular type of a success event it is and, thus, can pick the eventType from the static event types declared in its interface. The module will also decide whether this event should be processed synchronously or asynchronously, and set the boolean processSynch accordingly This decision could be done in the listener module instead.
3. the module can call the doSuccess(Map sourceInfo, String eventType, boolean processSynch) method on each of its success listeners
Event Receiver Side:
4. a listener module receives an event via its doSuccess( )method and delegates the work to either synchronous or asynchronous method. Eventually, the work will be done in the synchronous method doSuccess(Map sourceInfo, String eventType)
5. in the doSuccess( ) method: the receiver module knows what kinds of events it is interested in processing. It checks the eventType against the types it is interested in. If the type matches—it retrieves all information packed into the Map sourceInfo since at this point it knows what kinds of objects the map should contain
6. based on the eventType and sourceInfo data, the receiver module performs necessary business actions FIG. 5A is a class diagram depicting an exemplary module, GenericEventListener that implements both interfaces to be able to listen to both error and success events.

Figure 5B:
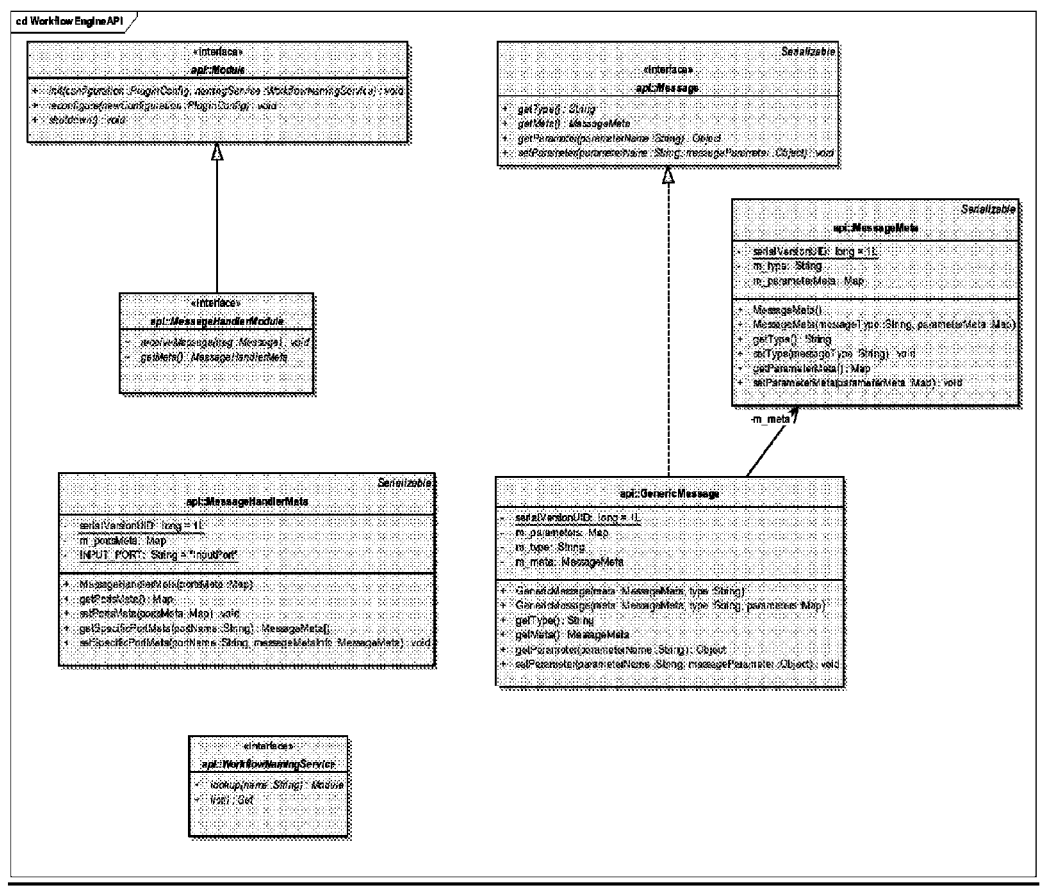

FIG. 5B is an exemplary class diagram.

Figure 5C:
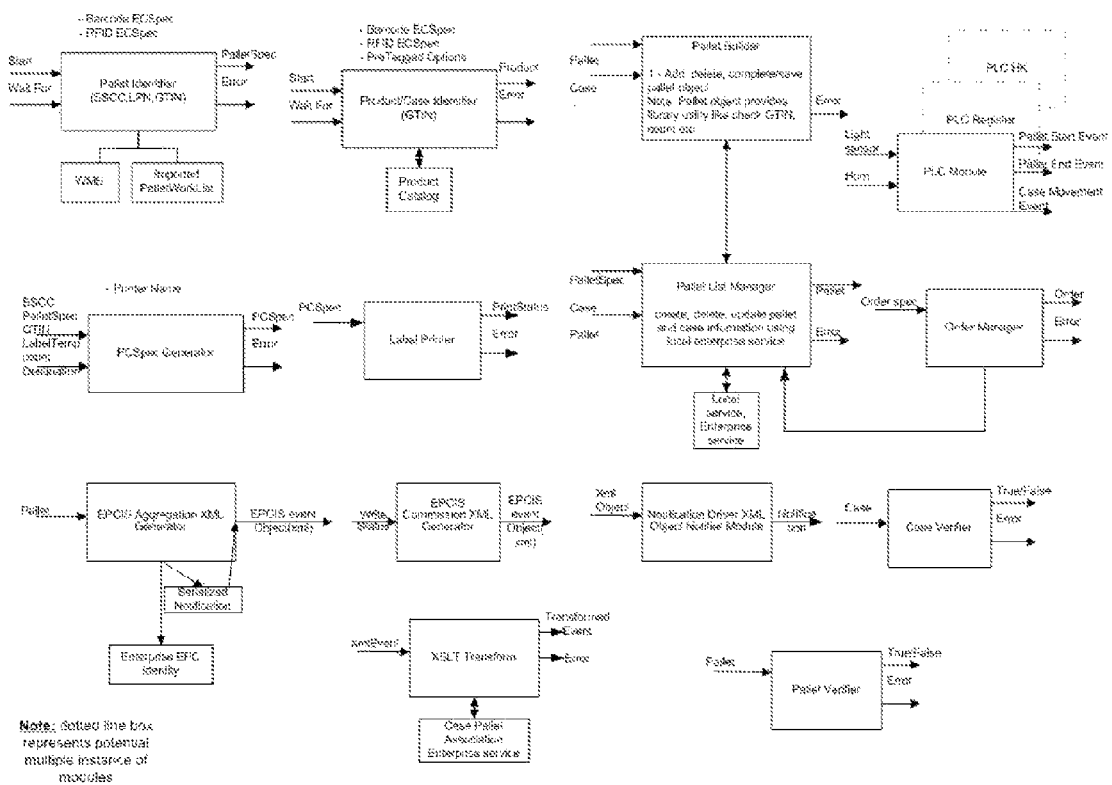

FIG. 5C illustrates workflow modules identified for Tag and Ship type workflows.

A LableGenerator module can generate PC Spec for Standard Business Objects.

A DirectionalPortal module can monitor tag data traffic between two read points and generate directional Observe event, turns stack light and increases count of LED.

Pseudo Workflow Implementation
JAVA as Module hook up option
JAVA option with direct method calls as module connection api
Workflow instance 1: ComplianceJumpStart

```
Method call based workflow design:
/**
 * Quick stab at workflow pseudo implementation in java
 *
 */
public class ComplianceJumpStartWorkflow implements
Runnable/*extends Module*/{
    AlertHandler m_alertHandler =
        // Handles all the exception cases for the workflow
        NamingService.getModule(getConfigItem("AlertHandler"));
    /* PalletProvider m_palletIdentifier =
    //   Selects pallet in non UI mode
        NamingService.getModule(getConfigItem("PalletProvider"));
    */
    PalletProvider m_palletSelector =
        // Selects pallet from UI
        NamingService.getModule(getConfigItem("PalletSelector"));
    CaseProvider m_caseIdentifier =
        // Selects case in non UI mode
        NamingService.getModule(getConfigItem("CaseProvider"));
    CaseProvider m_caseSelector =
        // Selects case from UI
        NamingService.getModule(getConfigItem("CaseSelector"));
    LabelGenerator m_labelGenerator =
        NamingService.getModule(getConfigItem("LabelGenerator"));
    LabelPrinter m_labelprinter =
        NamingService.getModule(getConfigItem("LabelPrinter"));
    PalletReporter m_palletReporter =
        // EPC aggregate event reporter
        NamingService.getModule(getConfigItem("AlertReporter"));
    CaseReporter m_caseReporter =
        NamingService.getModule(getConfigItem("CaseReporter"));
        // EPC commission object event reporter
    PalletVerifier m_palletVerifier =
        NamingService.getModule(getConfigItem("PalletVerifier"));
    CaseVerifier m_caseVerifier =
        NamingService.getModule(getConfigItem("CaseVerifier"));
    PalletListManager m_palletListManager =
        NamingService.getModule(getConfigItem("PalletListManager"));
    PalletBuilder m_palletBuilder =
        NamingService.getModule(getConfigItem("PalletBuilder"));
    public void run( ) { }
        while(true)
        {
            URI sscc = m_palletSelector.getPalletSSCC( );
            Pallet palletInProgress = m_palletListManager.getPallet(sscc);
            // Add cases to this pallet
            do
            {
                Case currentCase = m_caseSelector.getCase( );
                if(palletInProgress.isCaseExpected(palletInProgress,
                currentCase))
                {
                    PCSpec labelPCSpec =
```

```
            m_labelGenerator.generatePCSpec(palletInProgress,
               currentCase, "compliancePrinter",
               labelTemplateParameters);
            WriteStatus result = m_labelprinter.print(labelPCSpec);
            currentCase.SetEpc(result.getEpc( ));
            // Note: Need to display result to UI by some means
            if(m_caseVerifier.verify(currentCase))
            {
               m_palletBuilder.addCase(palletInProgress,
                           currentCase);
            }
         }
      }while(!m_palletSelector.EndOfPallet( ))// condition needs to
be finalize
      PCSpec palletLabelPCSpec =
         m_labelGenerator.generatePCSpec(palletInProgress,
            "compliancePrinter", labelTemplateParameters);
      WriteStatus result = m_labelprinter.print(palletLabelPCSpec);
      currentCase.SetEpc(result.getEpc( ));
      // Note: Need to display result to UI by some means
      if(m_palletVerifier.verify(palletInProgress))
      {
         m_palletBuilder.completePallet(palletInProgress);
      }
   }
  }
 }
```

Event Based Workflow Design:

```
public class CJSApplicationEventHandler
      extends Module
{
   private Module m_palletSelector;
   private Module m_caseSelector;
   private Module m_caseVerifier;
   private AlarmClock m_alarmClock;
   private ExceptionHandler m_exceptionHandler =
(ExceptionHandler)NamingService
.lookupModule(getConfigItem("exceptionHandlerModule")).getPort("
exceptionHandler");
   private LabelGenerator m_labelGenerator;
   private LabelWriter m_labelWriter;
   private Pallet m_palletInProgress;
   /**
    * Option 1a - modules are configured separately using
dynamic config or some other
    * XML-based module definition language. Note that
palletProvider, caseProvider, and
    * caseVerifier need to have their return events directed
back at this module in their
    * config, manually set by user.
    */
   public void init( )
   {
      m_palletSelector = (Module)NamingService.lookupModule(
getConfigItem("palletSelectorModule")).getPort("palletProvider")
      m_caseSelector = (Module)NamingService.lookupModule(
getConfigItem("caseSelectorModule")).getPort("caseProvider");
      m_caseVerifier = (Module)NamingService.lookupModule(
getConfigItem("caseVerifierModule")).getPort("caseVerifier");
   }
   /**
    * Option 1b - modules are created as subobjects of this
module, based on configuration
    * gotten as subconfigs of this module's configuration
    */
   public void readConfig( )
   {
      ModuleConfig palletSelectorConfig =
getSubConfig("palletSelector");
      m_palletSelector =
Module.createModule(palletSelectorConfig);
      // set ourselves as the event receiver for the Pallet
Selector return value after
      // creating it? see options 2a vs. 2b below
      m_palletSelector.setEventReceiver(this);
   }
   /**
    * @param e
    */
   public void handleEvent(Event e)
   {
      if (e.getName( ).equals("start"))
      {
         // option 2a - simply throw out a "go" event that
will tell the Pallet Selector to
         // pass a PalletProviderEvent to its configured
receiver
         m_palletSelector.receiveEvent(new
SimpleEvent("go"));
         // option 2b - Pallet Selector has no configured
receiver - instead, we pass the
         // receiver as a parameter on a "Method" event
         m_palletSelector.receiveEvent(new MethodEvent("go",
this));
         // do we even want to give the name of the return
event at this point, to make it
         // unique rather than specific to the event?
"palletProvider" right below may not
         // be specific enough information for us to
determine where we're coming from
         // there
      }
      else if (e.getName( ).equals("palletProvider"))
      {
         if (m_palletInProgress != null)
         {
            m_exceptionHandler.receiveEvent(new
ErrorEvent("Pallet already started", e));
            return;
         }
         PalletProviderEvent palletEvent =
(PalletProviderEvent)e;
         m_palletInProgress =palletEvent.getPallet( );
         m_caseSelector.receiveEvent(new SimpleEvent("go"));
      }
      else if (e.getName( ).equals("caseProvider"))
      {
         if (m_palletInProgress == null)
         {
            m_exceptionHandler.receiveEvent(new
ErrorEvent("Pallet not started", e));
            m_caseSelector.receiveEvent(new
SimpleEvent("go"));
            return;
         }
         CaseProviderEvent caseEvent = (CaseProviderEvent)e;
         Case currentCase = caseEvent.getCase( );
         if (!m_palletInProgress.isCaseExpected(currentCase))
         {
            m_exceptionHandler
               .receiveEvent(new ErrorEvent("Incorrect case
for pallet", e));
            m_caseSelector.receiveEvent(new
SimpleEvent("go"));
            return;
         }
         Map labelParameters = new HashMap( );
labelParameters.putAll(m_palletInProgress.getLabelParameters( ));
labelParameters.putAll(currentCase.getLabelParameters( ));
         Label caseLabel =
m_labelGenerator.createLabel(labelParameters);
         m_labelWriter.writeLabel(caseLabel,
(Object) currentCase);
         // (Object) cast only illustrative to show this
object is passed through blindly,
         // as a context object. Should this be workflow
state instead? Most probably. No
         // time to fix.
      }
      else if (e.getName( ).equals("labelWritten"))
      {
         LabelWrittenEvent event = (LabelWrittenEvent)e;
         Case currentCase = (Case)event.getContext( );
         if (m_palletInProgress == null)
```

```
        {
            m_exceptionHandler.receiveEvent(new
ErrorEvent("Pallet not started", e));
            m_caseSelector.receiveEvent(new
SimpleEvent("go"));
            return;
        }
        if (getBooleanConfigItem("skipCaseVerification"))
        {
            m_palletInProgress.addCase(currentCase);
            m_caseSelector.receiveEvent(new
SimpleEvent("go"));
        }
        else
        {
            verifyCase(currentCase);
        }
    }
    else if (e.getName( ).equals("labelWriteFailed"))
    {
        LabelWriteFailedEvent event =
(LabelWriteFailedEvent)e;
        m_exceptionHandler.receiveEvent(new
ErrorUserChoiceEvent("Label write failed", e,
            "labelWriteChoice", new String[ ]
            {
                "Pick Case", "Retry Print"
            }, event.getCase( )));
    }
    else if (e.getName( ).equals("labelWriteChoice"))
    {
        UserChoiceEvent uce = (UserChoiceEvent)e;
        // case and label should probably be workflow state
insteaof passed through as
        // "context" on event
        Case currentCase = (Case)uce.getContext( );
        String choice = uce.getUserChoice( );
        if (choice == null || choice.equals("Pick Case"))
            m_caseSelector.receiveEvent(new
SimpleEvent("go"));
        else
            m_labelWriter.writeLabel(currentCase.getLabel( ),
(Object)currentCase);
    }
    else if (e.getName( ).equals("caseVerified"))
    {
        CaseVerifiedEvent event = (CaseVerifiedEvent)e;
        Case currentCase = event.getCase( );
        m_palletInProgress.addCase(currentCase);
        m_caseSelector.receiveEvent(new SimpleEvent("go"));
    }
    else if (e.getName( ).equals("caseVerificationFailed"))
    {
        CaseVerificationFailedEvent event =
(CaseVerificationFailedEvent)e;
        m_exceptionHandler.receiveEvent(new
ErrorUserChoiceEvent(
            "Label verification failed", e,
"labelVerifyChoice", new String[ ]
            {
                "Pick Case", "Retry Verify"
            }, event.getCase( )));
    }
    else if (e.getName( ).equals("labelVerifyChoice"))
    {
        UserChoiceEvent uce = (UserChoiceEvent)e;
        // case and label should probably be workflow state
instead of passed through as
        // "context" on event
        Case currentCase = (Case)uce.getContext( );
        String choice = uce.getUserChoice( );
        if (choice == null || choice.equals("Pick Case"))
            m_caseSelector.receiveEvent(new
SimpleEvent("go"));
        else
            verifyCase(currentCase);
    }
    else if (e.getName( ).equals("finishPallet"))
    {
        if (m_palletInProgress == null)
        {
            m_exceptionHandler.receiveEvent(new
ErrorEvent("Pallet not started", e));
            return;
        }
        m_palletInProgress.finish( );
        receiveEvent(new SimpleEvent("start"));
    }
}
private void verifyCase(Case currentCase)
{
    int delay =
getIntegerConfigItem("delayBeforeVerification");
    if (delay == 0)
        m_caseVerifier.receiveEvent(new
VerifyCaseEvent(currentCase));
    else
    {
        // notify ui of status?
        m_alarmClock.queueEvent(delay, m_caseVerifier, new
VerifyCaseEvent(
            currentCase));
    }
}
```

Workflow Instance 2: TAAS

```
public class TASPalletWorkflow
    extends Workflow
{
    public void init( )
    {
        TASGUI m_tasgui = getModule("TASGUI");
        PLC m_tasplc = getModule("TASPLC");
        // Selects pallet in non UI mode
        PalletProvider m_palletScanner =
getModule("PalletScanner");
        // Selects pallet from UI
        PalletProvider m_palletSelector =
getModule("PalletSelector");
        PalletListManager m_palletListManager =
            getModule("PalletListManager");
        // PalletVerifier m_palletVerifier =
            getModule("PalletVerifier");
        // EPC aggregate event reporter
        PalletReporter m_palletReporter =
getModule("AlertReporter");
    }
    public void run( )
    {
        do
        {
            m_tasplc.waitForEvent("loadArrival");
            // 1 is start
            // 2 is stop
            // 3 is case
            if (m_tasplc.getItem("depalletType") == 1)
                break;
            m_tasgui.doOperatorChoice("Reset the conveyor and
press ok",
                                      new String[ ] { "OK" });
        }while(true);
        // (SOP, 0, 0, 0, 0)
        m_palletScanner.startGetPalletSSCC( );
        m_tasplc.sendMessage("releaseDepallet");
        m_tasplc.sendMessage("releaseReinduct");
        URI sscc = m_palletScanner.getPalletSSCC( );
        m_tasplc.sendMessage("releaseIdentify");
        m_tasplc.sendMessage("releaseTag");
        m_tasplc.sendMessage("releaseVerify");
        // if identifier failed to get sscc use
palletselector(UI) for
        // selecting SSCC
        if (sscc == null)
            sscc = m_palletSelector.getPalletSSCC( );
```

```
    Pallet palletInProgress =
m_palletListManager.getPallet(sscc);
        Set caseWorkflows = new HashSet( );
        m_tasgui.setPalletInProgress(palletInProgress);
        do
        {
            m_tasplc.waitForEvent("arriveDepallet");
            int loadType = m_tasplc.getItem("depalletType");
            if (loadType == 1)
            {
                // The user has three choices here.
                String action = m_tasgui.doOperatorChoice("remove
                    the start tote or close the pallet",new
                    String[ ] { "tote removed", "close pallet"
                    });
                if (action.equals("tote removed"))
                {
                    m_tasplc.waitForEvent("departDepallet");
                    continue;
                }
                else if (action.equals("close pallet"))
                {
                    // XXX how to deal with synthetic start?
                    break;
                }
            }
            else if (loadType == 2)
            {
                break;
            }
            else // case
            {
                TASCaseWorkflow cwf = new
TASCaseWorkflow(palletInProgress);
                caseWorkflows.add(cwf);
            }
        } while(true);
        waitForWorkflows(caseWorkflows);
        while (! palletInProgress.isComplete( ))
        {
            TASGUIAction action = m_tasgui.doOperatorChoice("add
                            another case, or close the pallet
                            short",
                                        new String[ ] {
            "add case", "close short" });
            if (action.equals("add case"))
            {
                Workflow case = new
TASCaseWorkflow(palletInProgress);
                    waitForWorkflow(case);
            }
            else if (action.equals("close short"))
            {
                break;
            }
        }
        boolean isEndTote = (m_tasplc.getItem("depalletType") ==
2);
        if (isEndTote)
        {
            m_tasplc.sendMessage("releaseDepallet");
            m_tasplc.sendMessage("releaseReinduct");
            m_tasplc.sendMessage("releaseIdentify");
        }
        m_tasgui.doOperatorChoice("confirm pallet close");
        palletInProgress.finish( );
        m_palletReporter.report(palletInProgress);
        m_tasgui.setPalletInProgress(null);
        if (isEndTote)
        {
            m_tasplc.sendMessage("releaseTag");
            m_tasplc.sendMessage("releaseVerify");
        }
    }
}
public class TASCaseWorkflow
    extends Workflow
{
    public void init( )
    {
        // Selects case in non UI mode
        CaseIdentifier m_caseScanner = getModule("CaseScanner");
        // Selects case from UI
        CaseIdentifier m_caseSelector = getModule("CaseSelector");
        LabelFormatter m_labelFormatter =
getModule("LabelFormatter");
        LabelPrinter m_labelPrinter = getModule("LabelPrinter");
        CaseVerifier m_caseVerifier = getModule("CaseVerifier");
        // EPC commission object event reporter
        CaseReporter m_caseReporter = getModule("CaseReporter");
    }
    public void run( )
    {
        m_tasplc.sendMessage("holdDepallet");
        boolean rescan;
        do
        {
            rescan = false;
            m_caseScanner.startGetCase( );
            m_tasplc.sendMessage("releaseReinduct");
            Case case = m_caseScanner.getCase( );
            int tagCount = case.getTagCount( );
            do
            {
                if (case.getBarcode( ) != null &&
                    (case.getTagCount( ) == 0 ||
                        (case.getTagCount( ) == 1 &&
                    case.getTag(0).getGTIN( ) ==
                    case.getBarcode( ).getGTIN( ))))
                    break;
                // this may require a custom gui method
                String action = m_tasgui.doOperatorChoice("enter
                        a barcode, remove the case, or remove
                        invalid tags and move the case to the
                        reinduct zone to try again",
                        new String[ ] {"enter barcode", "case
                        removed", "case reinducted" });
                if (action.equals("enter barcode"))
                {
                    // if scanner failed to get case use
                    caseselector(UI) for
                    // selecting case
                    if (case == null)
                        case = m_caseSelector.getCase( );
                    continue;
                }
                else if (action.equals("case removed"))
                {
                    // XXX maybe need to release zone 2
                    return;
                }
                else if (action.equals("case reinducted"))
                {
                    m_tasplc.waitForEvent("arriveReinduct");
                    rescan = true;
                    break;
                }
            }
            while (true);
        }
        while(rescan);
        if (m_tasplc.getItem("depalletType") == 3)
            m_tasplc.sendMessage("releaseDepallet");
        m_tasplc.sendMessage("releaseIdentify");
        if (!palletInProgress.isCaseExpected(case))
        {
            m_tasplc.waitForEvent("arriveTag");
            m_tasgui.doOperatorChoice("case is bogus, set it
aside",
                                new String[ ] {"OK" });
            return;
        }
        boolean pretagged = (case.getEPC( ) != null);
        if (pretagged)
            m_tasplc.sendMessage("releaseTag");
        while (case.getEPC( ) == null)
        {
            Label l = m_labelFormatter(new LabelFields[ ] {
                palletInProgress.getLabelFields( ),
                    currentCase.getLabelFields( ) });
```

```
    PCReport report = m_labelPrinter.print(l);
    // XXX if failure, reprint or remove case
    if (report.isFailure( ))
        continue;
    String action = m_tasgui.doOperatorChoice("apply
                                        tag, or print a new
                                        tag",
                                            new
                                            String[ ] { "tag
                                            applied", "print
                                            new tag" });
    // XXX need to wait for plc event, too.
    if (action.equals("print new tag"))
        continue;
    case.setEPC(report.getEPC( ));
    m_caseVerifier.startVerify( );
    m_tasplc.sendMessage("releaseTag");
    if (! m_caseVerifier.verify(case))
    {
        case.setEPC(null);
        m_tasgui.doOperatorChoice("remove tags and move
                                        to zone 5",
                                            new String[ ] { "OK"
    });
            }
        }
        palletInProgress.addCase(case);
        m_tasplc.sendMessage("releaseVerify");
        }
    }
```

JAVA option with events as well as direct method calls as module connection api (This model will expect workflow module as well as other module to maintain state machine to manage event handling.)

Workflow instance 1: ComplianceJumpStart

Workflow instance 2: TAAS

Figure 5D:
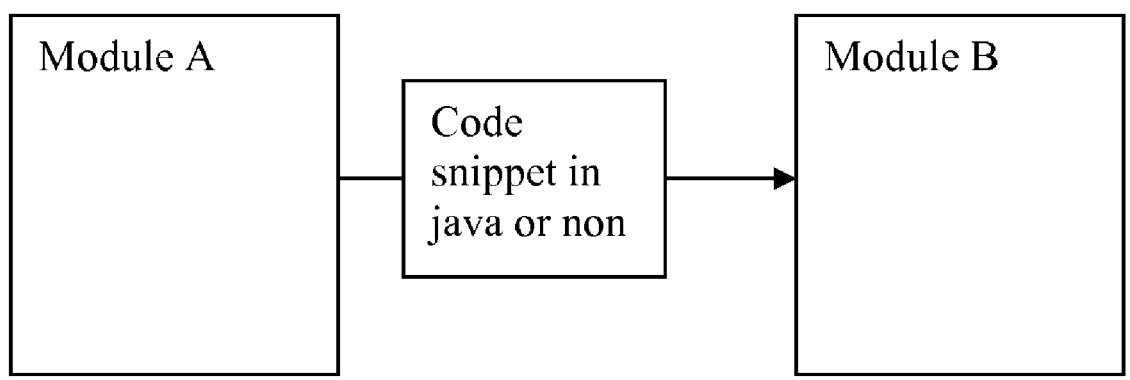

FIG. 5D shows modules and code snippet that connects modules.

Scripting (Swig, BSF, JavaScript, VB or some others) can expose java objects into scripting languages like JavaScript, visual basic, python etc. Current options are BSF (Bean scripting framework) and SWIG. They both exposes JAVA object into multiple scripting languages.

XML description language can be used to connect modules an (Engine will be provided to support this option). Overview: XML description seems a bit work to describe workflow. But this option is the one that will probably become backend for Visual Editor Option.

Describe module as well as workflow definition in XML and then implement and run workflow engine implemented in JAVA.

From different consideration seems like module definition can be delegated to WSDL type schema that defines what the module name is and what are the API it exposes (or it could be simpler XML definition schema). Workflow control flow definition part can require some standard conditionals and loop capabilities. Two options include:

Xml element group that represents one of the conditional or loop control (if . . . else, for, while). It takes input values and destination for all potential results as control input and output.

Use XSL type control definitions and then use in workflow definition. This will be our custom xml schema with some elements conforming to XSL style controls. It would not take any xml schema and support XSL type controls.

Here is one potential style,

```
<workflow>
  <step name="main"> <!-- special name for first step, receives "start"
message...? or maybe something with args that may need XSLT to start
up state? -->
    <module name="palletIdentifier" message="begin">
      <output name="SSCC"><step name="getPalletFromSSCC"/>
      </output>
      <output name="ErrorCode"><step name="palletErrorHandler"/>
      </output>
    </module>
  </step>
  <step name="getPalletFromSSCC"> <!-- input: SSCC -->
    <module name="palletListManager" message="lookup">
      <output name="Pallet"><step name="beginPallet"/></output>
      <output name="ErrorCode"><step name="palletErrorHandler"/>
      </output>
    </module>
        </step>
  <step name="beginPallet"> <!-- input: Pallet -->
    <module name="palletListManager" message="start">
      <output name="Pallet"><step name="getProductForPallet"/>
      </output>
      <output name="ErrorCode"><step name=
      "beginPalletErrorHandler"/></output>
    </module>
  </step>
  <step name="beginPalletErrorHandler"/> <!-- input: ErrorCode -->
    <!-- xslt thingie here with ErrorCode input that deals specially with
"pallet already started" error by passing control to getProductForPallet,
and otherwise passes it to palletErrorHandler -->
  </step>
  ...
</workflow>
```

Alternately, Visual Editor can define workflow.

The high-level features of the workflow framework can include:

A given local workflow instance is realized as instances of one or more "Workflow Modules" (WMs), which may make use of "Workflow Libraries" (WLs).

A WM is a JAVA class that is instantiated by the Edge Server. The Edge Server controls the lifecycle of the WM.

A WM is a "Plug-in" in the configuration framework that was introduced in RFTagAware 1.3. This means that a WM class has an associated descriptor ("Plug-in Meta") that defines the names and types of its configuration parameters, and that WM instances can be created, redefined, and destroyed through the config API.

The Administration Console will be extended to provide a interface similar to the "RFID Devices" screen to create and configure WM instances.

A WL is simply a class library that WMs may use. The edge server does not provide any configuration or lifecycle support to WLs.

One WM instance can interact with another by (a) obtaining a reference to the other WM instance via the Workflow Framework, then (b) calling a method. Depending on the WMs involved, this may be a simple method call (same thread), or a message pass (enqueued for execution on a different thread).

When one WM instance interacts with another, the WM usually exposes a configuration parameter that the user sets to the name of the other WM instance. This allows customers to assemble several WM instances into a larger workflow, and thereby also gives a degree of workflow customization beyond merely changing configuration parameters.

The container for WMs is the RFTagAware Edge Server itself. This means that WMs can be deployed in the same JVM as the Edge Server. If two separate processes are desired, however, a customer can deploy two Edge Servers: one configured only with RFID Devices and whose ALE API is used, and the other configured only with WMs which receives ALE notifications from the first.

Figure 6A:
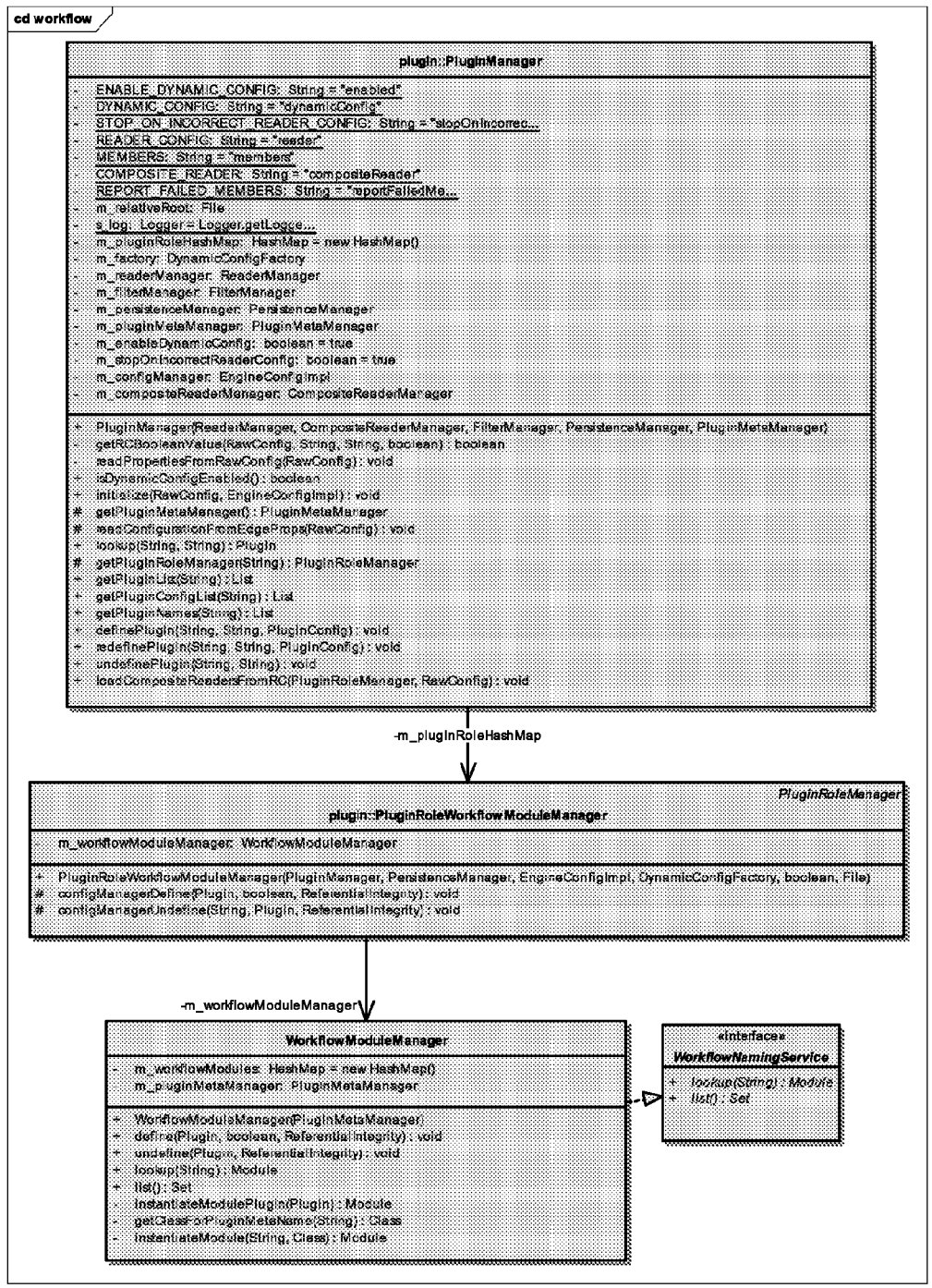
FIGS. 6A-6D illustrates details of a RFID workflow system.
Figure 6B:
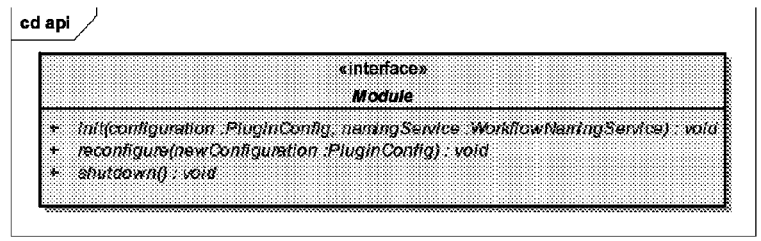
Figure 6C:
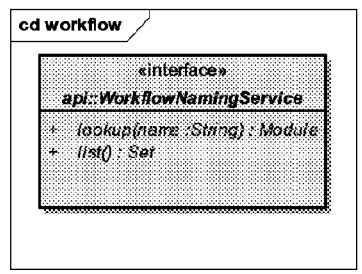

FIG. 6A shows an exemplary plug-in manager.

All Workflow modules can implement the Module interface—these are the hooks the Workflow infrastructure uses to configure the module and inform the module of changes. In addition to the methods in the interface, the Workflow infrastructure can use reflection to instantiate any Module—it can provide a constructor of the form:
public Module( );
i.e. a public constructor that takes no parameters.

This interface can define the service a Workflow naming Service must provide. The framework can take responsibility for providing a WorkflowNamingService to modules in their ubut( ) methods.

Figure 6D:
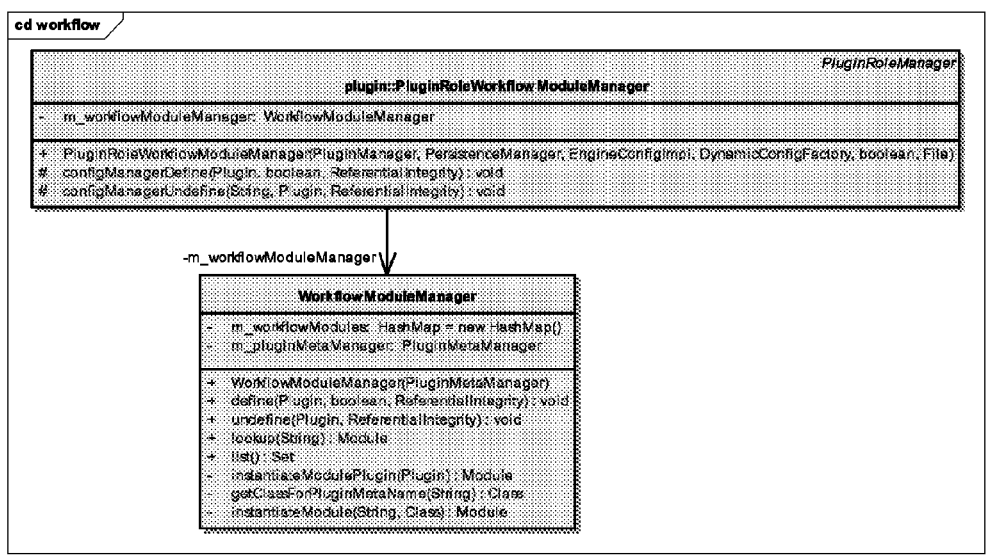

FIG. 6D shows an WorkflowMoudleManager class module interface.

A configuration option can be used to add a new workflow entrypoint to the Work menu. A toggle will be added to the Workflow configuration panel, indicating whether the user wishes to have the new item displayed on the Work menu.

The new menu item, "Tag Parcel", can be greyed when a Pallet is in progress.

Selecting "Tag Parcel" can display a parcel entry/selection screen, allowing the user to select or enter an SSCC. This will display the same work list as the pallet entry/selection screen; in ModusLink's workflow, the list will be empty, and the SSCC can only be entered in the text field, which has the keyboard focus when the screen is entered.

Once the user selects or enters this SSCC, the application can display the tag print/verification screen, and print and verify the SSCC tag just as it would for a pallet. It prints the tag, waits for the verification delay, and verifies the tag. Once the tag is verified, the "Cancel" button changes to allow the user to return to the work menu, just as it does after printing a pallet label.

In the database, the parcel is recorded as a complete pallet with no cases on board.

Figure 7A:
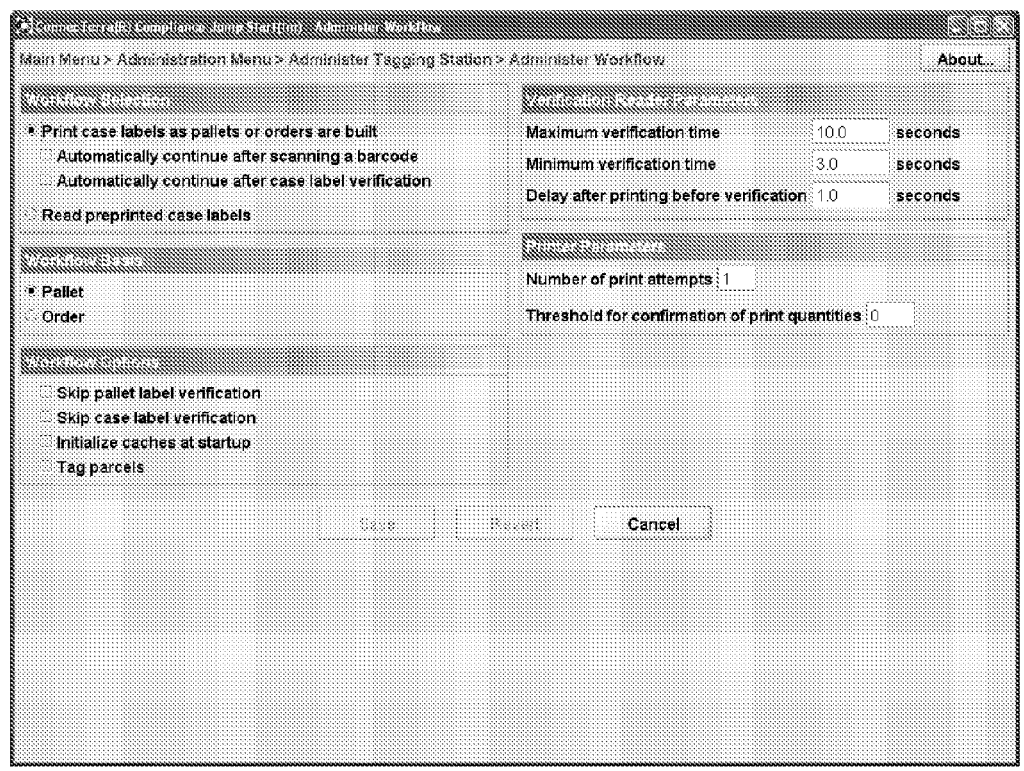

FIG. 7A shows two new UI elements—the workflow option and the new menu item that is presented only when that workflow option is enabled.

Figure 7B:
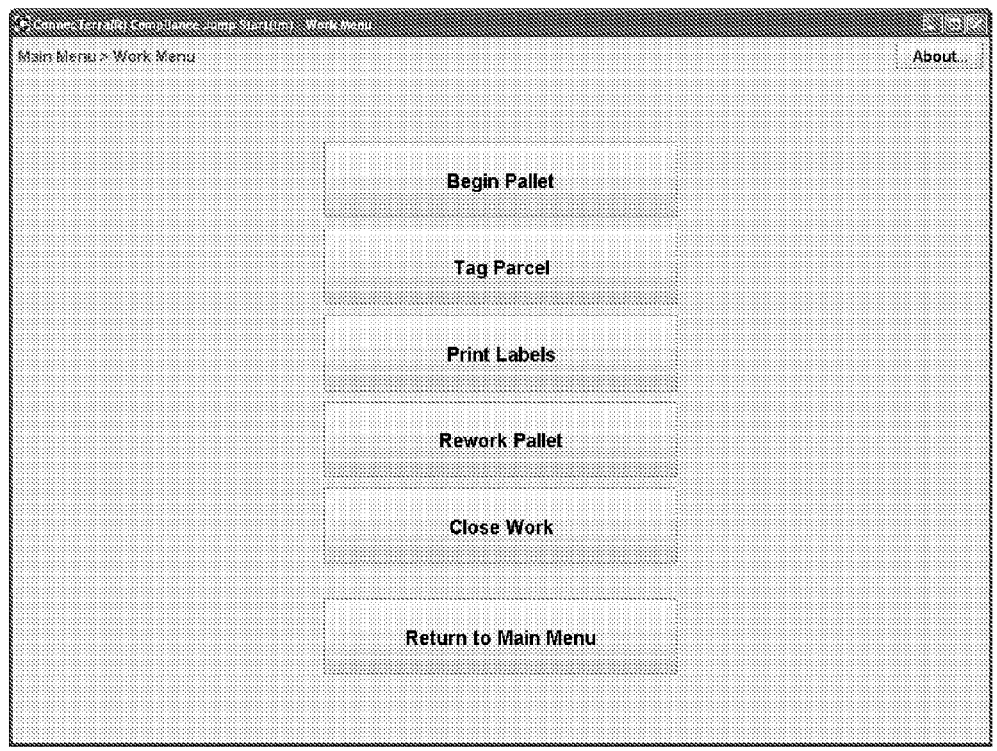
Figure 7C:
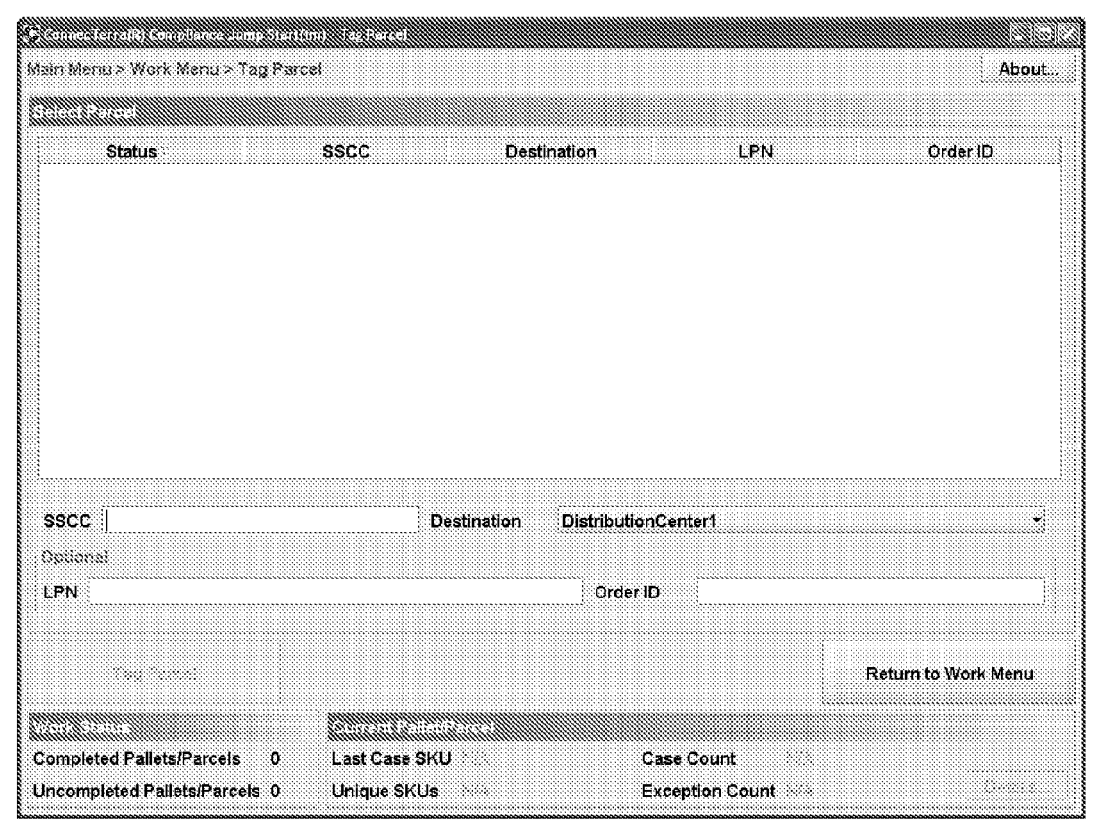

FIG. 7B shows exemplary systems to a menu bottom "Tag parcel".

Once the user selects "Tag Parcel" the application can prompt the user for an SSCC. Most of the other fields will be unused in ModusLink's use case, but this screen provides the most general use.

After the user has selected a parcel, the application can print a label, using the existent label print status screen. It need not be possible to supply case label instructions at this step, since a parcel is not associated with a specific product from the catalog.

The Parcel workflow can expose a new event, the ParcelTagVerified event, which is triggered once a printed parcel tag has been successfully verified. This event can produce the same notification to a PLC or other system as the CaseTagVerified event in the other workflows.

Figure 7D:
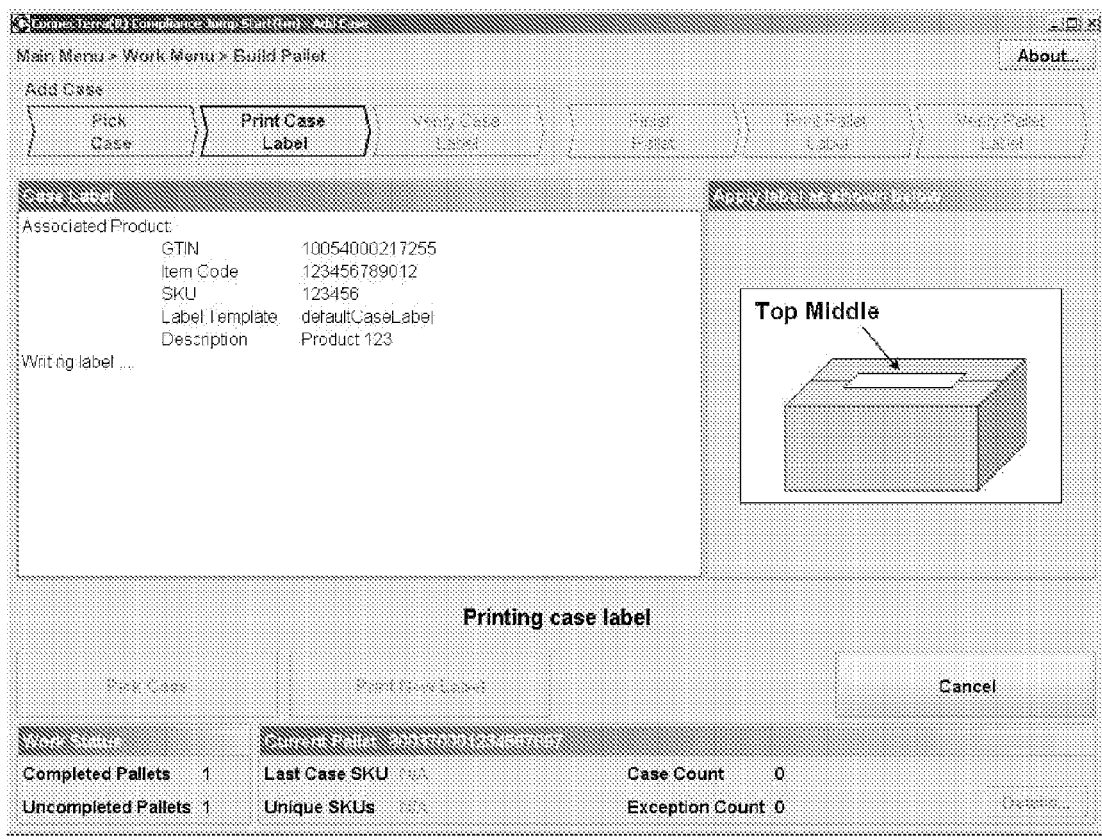

FIG. 7D shows an interface showing case label instructions

When printing and verifying the label for a case, the CJS application can sometimes display case label instructions. It can show these instructions if the product associated with that case has a case label instructions image in the product catalog.

This image cab be displayed during both the "Print Labels" workflow and the standard CJS print/apply/verify workflow ("Begin/Resume Pallet").

Example Workflow Use Cases (based on Kerry's input)
1. Verify tag count in a wrapped pallet
   input: shrink-wrapped pallet
   spin pallet and read the number of tags in the pallet
   if the count is less then a pre-defined threshold—turn a stack light to red
2. Pallet re-working
   input: pallet
   read Pallet Manifest
   break the pallet into cases and process the cases one by one
   add/edit cases to the pallet
3. (fur) inventory control
   all items (fur coats) have RFID tags attached to them— they populate the pool of traceable tags
   report location of each of the tags when asked
   record and report movement of each tag when it is moved between locations
4. Emergency Room patient tracking and data processing
   patients are issued RFIS tags at admittance
   tags are associated with additional info (prescriptions, diagnoses, etc.) and this information is retrieved upon a tag read
5. truck tracking
   trucks have RFID tags attached
   when a truck passes a stationary gate (reader)—the tag is reported to WMS
6. CJS variations:
   associate cases with orders (instead of pallets)
   put SGTIN on pallets
   put SSCC on cases
   turn verification on/off; add cancel capability on a per-instance bases
7. Novartis super-fast and super-small tag processing
   input: conveyor carries small bottles with tiny RFID tags on their labels
   a very small RFID reader reads bottle tags one by one
   if a tag is not verified—PLC device is notified and the bottle is purged from the conveyor
8. Selective RFID label printing
   items that require RFID labels are processed on the same conveyor as the ones that do not need RFID labels
   a trigger indicates whether a current item needs an RFID label or not
   if it is an RFID-label item—print an RFID label; verify the tag (possibly manually)
   if it is not—print a normal label One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system comprising:
   a radio frequency identification (RFID) edge server executed on a computing device, wherein the RFID edge server includes a workflow engine, a plurality of RFID workflow modules, a set of metadata, and a plurality of listener modules;
   one or more RFID readers in communication with the RFID edge server, wherein the RFID edge server receives and processes data from the RFID readers to implement a workflow that uses the received RFID data to perform a RFID process, wherein
   the workflow engine accesses a plurality of RFID workflow modules that employ said data from the RFID readers to execute the workflow to perform the RFID process, and wherein the plurality of RFID workflow modules communicate among each other synchronously or asynchronously to compose said workflow that controls the operation of elements in a warehouse, and wherein the workflow engine manages a lifecycle of each of said RFID workflow modules;
   the set of metadata is associated with each of the plurality of RFID workflow modules and is accessed by the RFID edge server, wherein the set of metadata indicates configurable elements for the particular RFID workflow module associated with the set of metadata;
   the plurality of listener modules detect one or more events for the plurality of RFID workflow modules, and wherein each RFID workflow module subscribes to at least one of the plurality of listener modules;
   an administration console associated with the RFID edge server, wherein the administration console produces a configuration page for each of the plurality of RFID workflow modules based on the set of metadata associated with each of said RFID workflow modules, the configuration page allowing a user to configure each RFID workflow module associated with the metadata;
   an event mechanism implemented by the workflow engine, wherein upon initiation of the lifecycle of each RFID workflow module, the event mechanism subscribes each RFID workflow module to at least one of the plurality of listener modules to detect one or more events based on the metadata obtained from the configuration page, and wherein the event mechanism defines the response that will be generated by each RFID workflow module to implement the workflow; and
   wherein during execution of the workflow, each of the RFID workflow modules that compose the workflow respond to said one or more events and trigger said response in order to implement the workflow to perform the RFID process to control the operation of said elements in the warehouse.

2. The system of claim 1, wherein the RFID readers obtain RFID data from RFID tags.

3. The system of claim 1, wherein a subset of said RFID workflow modules communicate synchronously and another subset of said RFID workflow modules communicate asynchronously.

4. A non-transitory computer readable storage medium storing one or more sequences of instructions, said instructions executed by one or more processors to produce:
   a radio frequency identification (RFID) edge server executed on a computing device, wherein the RFID edge server includes a workflow engine, a plurality of RFID workflow modules, a set of metadata, and a plurality of listener modules;
   one or more RFID readers in communication with the RFID edge server, wherein the RFID edge server receives and processes data from the RFID readers to implement a workflow that uses the received RFID data to perform a RFID process, wherein
   the workflow engine accesses a plurality of RFID workflow modules that employ said data from the RFID readers to execute the workflow to perform the RFID process, and wherein the plurality of RFID workflow modules communicate among each other synchronously or asynchronously to compose said workflow that controls the operation of elements in a warehouse, and wherein the workflow engine manages a lifecycle of each of said RFID workflow modules;

the set of metadata is associated with each of the plurality of RFID workflow modules and is accessed by the RFID edge server, wherein the set of metadata indicates configurable elements for the particular RFID workflow module associated with the set of metadata;

the plurality of listener modules detect one or more events for the plurality of RFID workflow modules, and wherein each RFID workflow module subscribes to at least one of the plurality of listener modules;

an administration console associated with the RFID edge server, wherein the administration console produces a configuration page for each of the plurality of RFID workflow modules based on the set of metadata associated with each of said RFID workflow modules, the configuration page allowing a user to configure each RFID workflow module associated with the metadata;

an event mechanism implemented by the workflow engine, wherein upon initiation of the lifecycle of each RFID workflow module, the event mechanism subscribes each RFID workflow module to at least one of the plurality of listener modules to detect one or more events based on the metadata obtained from the configuration page, and wherein the event mechanism defines the response that will be generated by each RFID workflow module to implement the workflow; and wherein during execution of the workflow, each of the RFID workflow modules that compose the workflow respond to said one or more events and trigger said response in order to implement the workflow to perform the RFID process to control the operation of said elements in the warehouse.

5. The computer readable medium of claim 4, wherein the RFID readers obtain RFID data from RFID tags.

6. The computer readable medium of claim 4, wherein a subset of said RFID workflow modules communicate synchronously and another subset of said RFID workflow modules communicate asynchronously.

7. A method comprising:

receiving data from one or more radio frequency identification (RFID) readers to an RFID edge server executed on a computing device, wherein the RFID edge server includes a workflow engine, a plurality of RFID workflow modules, a set of metadata, and a plurality of listener modules;

constructing at least one workflow that controls the operation of elements in a warehouse, wherein the workflow is composed of the plurality of RFID workflow modules that employ said data from the RFID readers to execute the workflow to perform a RFID process, and wherein the plurality of RFID workflow modules communicate among each other synchronously or asynchronously;

executing the workflow in the workflow engine, wherein said workflow engine manages a lifecycle of each of said RFID workflow modules associating the set of metadata with each of the plurality of RFID workflow modules, wherein the set of metadata indicates configurable elements for the particular RFID workflow module associated with the set of metadata, and wherein the set of metadata is accessed by the RFID edge server;

providing the plurality of listener modules to detect one or more events for the plurality of RFID workflow modules, and wherein each RFID workflow module subscribes to at least one of the plurality of listener modules;

producing a configuration page on an administration console associated with the RFID edge server, wherein the configuration page is constructed for each of the plurality of RFID workflow modules based on the set of metadata associated with each of said RFID workflow modules, the configuration page allowing a user to configure the RFID workflow module associated with the metadata; and implementing an event mechanism by the workflow engine, wherein upon initiation of the lifecycle of each RFID workflow module, the event mechanism subscribes each RFID workflow module to at least one of the plurality of listener modules to detect one or more events based on the metadata obtained from the configuration page, and wherein the event mechanism defines the response that will be generated by each RFID workflow module to implement the workflow; and wherein during execution of the workflow, each of the RFID workflow modules that compose the workflow respond to said one or more events and trigger said response in order to implement the workflow to perform the RFID process to control the operation of said elements in the warehouse.

8. The method of claim 7, wherein the RFID readers obtain RFID data from RFID tags.

9. The method of claim 7, wherein a subset of said RFID workflow modules communicate synchronously and another subset of said RFID workflow modules communicate asynchronously.

* * * * *

UNITED STATES PATENT AND TRADEMARK OFFICE
CERTIFICATE OF CORRECTION

| | |
|---|---|
| PATENT NO. | : 8,120,489 B2 |
| APPLICATION NO. | : 11/759323 |
| DATED | : February 21, 2012 |
| INVENTOR(S) | : Hatanaka et al. |

It is certified that error appears in the above-identified patent and that said Letters Patent is hereby corrected as shown below:

In column 1, line 12, delete "2006;" and insert -- 2006. --, therefor.

In column 1, line 28, delete "Fore" and insert -- For --, therefor.

In column 4, line 18, delete "(LabelGeneratationRequestMessage):" and insert -- LabelGenerationRequestMessage): --, therefor.

In column 4, line 39-40, delete "LabelGeneratationRequestMessage.class(ALE object)" and insert -- LabelGenerationRequestMessage.class(ALE object) --, therefor.

In column 4, line 41, delete "Map.class Map" and insert -- Map.class(Map --, therefor.

In column 6, line 1, delete "Message "is CaseExpected"" and insert -- Message "isCaseExpected" --, therefor.

In column 6, line 13, delete "Message "is PalletExpected"" and insert -- Message "isPalletExpected" --, therefor.

In column 14, line 23, delete "aggregatin" and insert -- aggregation --, therefor.

In column 14, line 41, delete "aggregatin" and insert -- aggregation --, therefor.

In column 15, line 46, delete "conition" and insert -- condition --, therefor.

In column 19, line 55, delete "server" and insert -- serve --, therefor.

In column 24, line 11, delete "LableGenerator" and insert -- LabelGenerator --, therefor.

In column 26, line 13, delete "recevier" and insert -- receiver --, therefor.

Signed and Sealed this
First Day of May, 2012

David J. Kappos
*Director of the United States Patent and Trademark Office*

CERTIFICATE OF CORRECTION (continued)
U.S. Pat. No. 8,120,489 B2

In column 27, line 30, delete "insteaof" and insert -- instead of --, therefor.

In column 33, line 21, delete "WorkflowMoudleManager" and insert -- WorkflowModuleManager --, therefor.

In column 34, line 8, delete "then" and insert -- than --, therefor.